(12) United States Patent
Chen

(10) Patent No.: US 11,768,293 B2
(45) Date of Patent: Sep. 26, 2023

(54) METHOD AND DEVICE FOR ADJUSTING PARAMETERS OF LIDAR, AND LIDAR

(71) Applicant: SUTENG INNOVATION TECHNOLOGY CO., LTD., Shenzhen (CN)

(72) Inventor: Xiangguang Chen, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/094,346

(22) Filed: Jan. 7, 2023

(65) Prior Publication Data

US 2023/0161045 A1    May 25, 2023

Related U.S. Application Data

(63) Continuation of application No. PCT/CN2021/105048, filed on Jul. 7, 2021.

(30) Foreign Application Priority Data

Jul. 8, 2020   (CN) .......................... 202010650848.4

(51) Int. Cl.
   *G01S 17/89*     (2020.01)
   *G01S 17/931*    (2020.01)

(52) U.S. Cl.
   CPC ............. *G01S 17/89* (2013.01); *G01S 17/931* (2020.01)

(58) Field of Classification Search
   CPC ...... G01S 17/93; G01S 17/931; G01S 17/933; G01S 7/497; G01S 7/4802; G01S 17/89

USPC ......................................................... 702/152
See application file for complete search history.

(56) References Cited

U.S. PATENT DOCUMENTS

| | | | |
|---|---|---|---|
| 2017/0293810 A1* | 10/2017 | Allen | G06V 20/56 |
| 2020/0025935 A1* | 1/2020 | Liang | G06V 10/764 |
| 2020/0081105 A1 | 3/2020 | Zhou et al. | |

FOREIGN PATENT DOCUMENTS

| | | |
|---|---|---|
| CN | 1894597 A | 1/2007 |
| CN | 103760569 A | 4/2014 |
| CN | 108072880 A | 5/2018 |
| CN | 108375775 A | 8/2018 |
| CN | 109597093 A | 4/2019 |
| CN | 109871850 A | 6/2019 |
| CN | 110171417 A | 8/2019 |

(Continued)

OTHER PUBLICATIONS

First Office Action issued in related Chinese Application No. 202010650848.4, dated Aug. 25, 2020, 51 pages.

(Continued)

*Primary Examiner* — John H Le
(74) *Attorney, Agent, or Firm* — BAYES PLLC

(57) ABSTRACT

An embodiment of the present application relates to the field of radar technology, and discloses a method and a device for adjusting parameters of LiDAR, and a LiDAR. The method includes: acquiring 3D environment information around the LiDAR; identifying a scenario type where the LiDAR is positioned and a drivable area based on the 3D environment information; determining a parameter adjusting strategy of the LiDAR based on the scenario type and the drivable area; and adjusting current operating parameters of the LiDAR based on the parameter adjusting strategy.

6 Claims, 17 Drawing Sheets

(56) References Cited

FOREIGN PATENT DOCUMENTS

| CN | 110275167 A | 9/2019 |
| CN | 110376594 A | 10/2019 |
| CN | 110531339 A | 12/2019 |
| CN | 110654320 A | 1/2020 |
| CN | 110703216 A | 1/2020 |
| CN | 110703223 A | 1/2020 |
| CN | 110795821 A | 2/2020 |
| CN | 110824476 A | 2/2020 |

OTHER PUBLICATIONS

Second Office Action issued in related Chinese Application No. 202010650848.4, dated Sep. 9, 2020, 16 pages.

* cited by examiner

METHOD AND DEVICE FOR ADJUSTING PARAMETERS OF LIDAR, AND LIDAR

CROSS-REFERENCE TO RELATED APPLICATION

The present application is a continuation of International Application No. PCT/CN2021/105048, filed on Jul. 7, 2021, which claims the benefit of priority to China Patent Application No. CN 202010650848.4, filed on Jul. 8, 2020, the contents of which are incorporated herein by reference in their entireties.

TECHNICAL FIELD

Embodiments of the present disclosure relate to the field of radar technology, and more particularly, to a method and a device for adjusting parameters of LiDAR, and a LiDAR.

BACKGROUND

Currently, because of its excellent characteristics and strong adaptability to an external environment, a LiDAR has been widely used in automatic driving, aided driving and other fields.

The LiDAR in a prior art generally maintains a fixed working frequency, a fixed detection angle and a fixed range, and does not have ability to dynamically adjust operating parameters, so that no matter what type of scenario is provided, the LiDAR maintains the same parameters.

SUMMARY

One objective of embodiments of the present disclosure is to provide a method and device for adjusting parameters of LiDAR, and a LiDAR, which can automatically adjust operating parameters of the LiDAR according to different scenarios.

According to one aspect of an embodiment of the present disclosure, there is provided a method for adjusting parameters of a LiDAR, including the following steps: acquiring 3D environment information around the LiDAR; identifying a scenario type where the LiDAR is positioned and a drivable area based on the 3D environment information; determining a parameter adjusting strategy of the LiDAR based on the scenario type and the drivable area; and adjusting current operating parameters of the LiDAR based on the parameter adjusting strategy.

In some embodiments, the 3D environment information includes 3D point cloud data. The step of identifying the scenario type where the LiDAR is positioned and the drivable area based on the 3D environment information specifically includes: processing the 3D point cloud data to generate a multi-channel point cloud feature map; extracting high-dimensional feature information from the multi-channel point cloud feature map; determining the scenario type according to the high-dimensional feature information; and determining the drivable area according to the high-dimensional feature information.

In some embodiments, the step of extracting the high-dimensional feature information from the multi-channel point cloud feature map specifically includes: inputting the multi-channel point cloud feature map into a first neural network, and acquiring the high-dimensional feature information output by the first neural network.

The step of determining the scenario type according to the high-dimensional feature information specifically includes: inputting the high-dimensional feature information into a second neural network; acquiring an output value of the scenario type output by the second neural network; and determining the scenario type corresponding to the output value of the scenario type according to a corresponding relationship between an output value of a preset scenario type and a scenario type label.

The step of determining the drivable area according to the high-dimensional feature information specifically includes: inputting the high-dimensional feature information into a third neural network; acquiring an output map of the drivable area output by the third neural network; and determining the drivable area corresponding to the output map of the drivable area according to a corresponding relationship between an output map of a preset drivable area and a drivable area label.

In some embodiments, the steps of determining the parameter adjusting strategy of the LiDAR based on the scenario type and the drivable area, and adjusting the current operating parameters of the LiDAR based on the parameter adjusting strategy specifically include: according to the scenario type, determining scenario parameter adjusting strategies of one or more of a horizontal angle of field of view of the LiDAR, a vertical angle of field of view of the LiDAR, a direction of an optical axis of an emitting laser beam of the LiDAR, a scanning density of the LiDAR, a scanning frequency of the LiDAR, and a pulse emitting power of the LiDAR; adjusting the scenario parameter adjusting strategy according to the drivable area; determining the adjusted scenario parameter adjusting strategy as the parameter adjusting strategy of the LiDAR, and adjusting the current operating parameters of the LiDAR based on the parameter adjusting strategy.

In some embodiments, the steps of adjusting the scenario parameter adjusting strategy according to the drivable area, determining the adjusted scenario parameter adjusting strategy as the parameter adjusting strategy of the LiDAR, and adjusting the current operating parameters of the LiDAR based on the parameter adjusting strategy specifically include: according to the scenario type, acquiring a standard driving area in the scenario type and driving parameter adjusting strategies of the horizontal angle of field of view of the LiDAR and the vertical angle of field of view of the LiDAR that correspond to the standard driving area, matching the standard driving area with the drivable area, adjusting the scenario parameter adjusting strategy according to the matching results and the driving parameter adjusting strategy, and adjusting the current operating parameters of the LiDAR based on the adjusted scenario parameter adjusting strategy.

In some embodiments, the steps of matching the standard driving area with the drivable area, and adjusting the scenario parameter adjusting strategy according to the matching results and the driving parameter adjusting strategy specifically include: analyzing a topological structure of the drivable area and a topological structure of the standard driving area; calculating a topological correlation between the topological structure of the drivable area and the topological structure of the standard driving area; determining a scenario difference coefficient of the drivable area relative to the standard driving area according to the topological correlation; and adjusting the scenario parameter adjusting strategy according to the scenario difference coefficient and the driving parameter adjusting strategy.

In some embodiments, the current operating parameters of the LiDAR comprise one or more of a vertical angle of field of view of an emitting laser beam of the LiDAR, a horizontal angle of field of view of the emitting laser beam of the LiDAR, a direction of an optical axis of the emitting laser beam of the LiDAR, a scanning frequency of the LiDAR, and a pulse emitting frequency of the LiDAR.

According to another aspect of an embodiment of the present disclosure, there is provided a device for adjusting parameters of a LiDAR, including: an environment information acquisition module, configured to acquire 3D environment information around the LiDAR; an identification module, configured to identify a scenario type where the LiDAR is positioned and a drivable area based on the 3D environment information; and an adjusting module, configured to determine a parameter adjusting strategy of the LiDAR based on the scenario type and the drivable area and adjust current operating parameters of the LiDAR based on the parameter adjusting strategy.

According to yet another aspect of the embodiment of the present disclosure, there is provided a LiDAR, including an emitting device, a receiving device, a processor, a memory, a communication interface, and a communication bus, where the processor, the memory, and the communication interface complete mutual communication via the communication bus. The emitting device is configured to emit emergent laser to a detection area. The receiving device is configured to receive echo laser reflected by an object in the detection area. The memory is configured to store at least one executable instruction, and the executable instruction causes the processor to execute the steps of the method for adjusting the parameters of the LiDAR described above.

According to another aspect of an embodiment of the present disclosure, there is provided a method for adjusting parameters of LiDAR, which is applied to a LiDAR system including the plurality of LiDARs, and the method includes:
  acquiring 3D environmental information around the LiDAR system;
  identifying a scenario type where the LiDAR system is positioned and a drivable area based on the 3D environment information;
  according to the scenario type, determining scenario parameter adjusting strategies of one or more of a horizontal angle of field of view of at least one LiDAR, a vertical angle of field of view of the LiDAR, a direction of an optical axis of an emitting laser beam of the LiDAR, a scanning density of the LiDAR, a scanning frequency of the LiDAR, and a pulse emitting power of the LiDAR of the LiDAR system; and
  according to the drivable area, adjusting the scenario parameter adjusting strategy of at least one LiDAR, determining the adjusted scenario parameter adjusting strategy as the parameter adjusting strategy of at least one LiDAR, and adjusting the current operating parameter of at least one LiDAR based on the parameter adjusting strategy.

In some embodiments, the step of acquiring the 3D environmental information around the LiDAR system includes:
  acquiring 3D environmental information around the LiDAR system via one LiDAR in the LiDAR system, where one LiDAR is a LiDAR that detects a mid-to-far detection field of view; or
  alternatively, acquiring the 3D environmental information around the LiDAR system via the plurality of LiDARs in the LiDAR system, where the plurality of LiDARs correspond to different detection fields of view, and the plurality of LiDARs are integrated to acquire the 3D environment information respectively to acquire a complete 3D environment information of the LiDAR system.

In some embodiments, after the step of identifying the scenario type where the LiDAR system is positioned and the drivable area based on the 3D environment information, the method further includes:
  determining a scanning area range corresponding to the scenario type according to the scenario type;
  determining a scanning area range of each LiDAR in the LiDAR system; and
  determining whether the LiDAR in the LiDAR system is in a working state according to the scanning area range corresponding to the scenario type and the scanning area range of each LiDAR in the LiDAR system.

In some embodiments, the step of determining whether the LiDAR in the LiDAR system is in the working state according to the scanning area range corresponding to the scenario type and the scanning area range of each LiDAR in the LiDAR system includes:
  selecting the LiDAR for detecting the mid-to-far detection field of view in the LiDAR system to work when the identified scenario type is a highway scenario; and
  selecting all LiDARs in the LiDAR system to work when the identified scenario type is an intersection scenario.

In some embodiments, the step of, according to the scenario type, determining scenario parameter adjusting strategies of one or more of a horizontal angle of field of view of at least one LiDAR, a vertical angle of field of view of the LiDAR, a direction of an optical axis of an emitting laser beam of the LiDAR, a scanning density of the LiDAR, a scanning frequency of the LiDAR, and a pulse emitting power of the LiDAR of the LiDAR system includes:
  acquiring an identifier of each LiDAR in the LiDAR system; and
  according to a corresponding relationship among the preset scenario type, the identifier of at least one LiDAR in the LiDAR system, and the scenario parameter adjusting strategy, determining the scenario parameter adjusting strategies of one or more of the horizontal angle of field of view of at least one LiDAR, the vertical angle of field of view of the LiDAR, the direction of the optical axis of the emitting laser beam of the LiDAR, the scanning density of the LiDAR, and the pulse emitting power of the LiDAR of the LiDAR system corresponding to the scenario type and the identifier of at least one LiDAR in the LiDAR system.

In some embodiments, the steps of adjusting the scenario parameter adjusting strategy of at least one LiDAR according to the drivable area, determining the adjusted scenario parameter adjusting strategy as the parameter adjusting strategy of at least one LiDAR, and adjusting the current operating parameter of at least one LiDAR based on the parameter adjusting strategy specifically include:
  according to the scenario type, acquiring a standard driving area in the scenario type and driving parameter adjusting strategies of the horizontal angle of field of view and the vertical angle of field of view of at least one LiDAR of the LiDAR system corresponding to the standard driving area;
  matching the standard driving area with the drivable area, and adjusting the scenario parameter adjusting strategy of at least one LiDAR in the LiDAR system according to matching results and the driving parameter adjusting strategy of at least one LiDAR in the LiDAR system; and adjusting the current working parameter of at least one LiDAR in the LiDAR system based on the scenario parameter adjusting strategy of at least one LiDAR in the LiDAR system.

In some embodiments, the steps of matching the standard driving area with the drivable area, and adjusting the scenario parameter adjusting strategy of at least one LiDAR in the LiDAR system according to matching results and the driving parameter adjusting strategy of at least one LiDAR in the LiDAR system includes:

analyzing a topological structure of the drivable area and a topological structure of the standard driving area;

calculating a topological correlation between the topological structure of the drivable area and the topological structure of the standard driving area;

determining a scenario difference coefficient of the drivable area relative to the standard driving area according to the topological correlation; and adjusting the scenario parameter adjusting strategy of at least one LiDAR in the LiDAR system according to the scenario difference coefficient and the driving parameter adjusting strategy of at least one LiDAR in the LiDAR system.

In some embodiments, the step of adjusting the scenario parameter adjusting strategy of at least one LiDAR in the LiDAR system according to the scenario difference coefficient and the driving parameter adjusting strategy of at least one LiDAR in the LiDAR system includes:

acquiring a standard parameter of field of view in the driving parameter adjusting strategy of at least one LiDAR in the LiDAR system;

according to the scenario difference coefficient, calculating a new parameter of field of view in an equal proportion based on the standard parameter of field of view; and according to the new parameter field of view, adjusting the vertical angle of field of view and the horizontal angle of field of view in the scenario parameter adjusting strategy of at least one of the LiDAR in the LiDAR system.

According to another aspect of an embodiment of the present disclosure, there is provided a LiDAR system, including a plurality of LiDARs. The plurality of LiDARs are arranged on the same plane of a carrying device of the LiDAR system or arranged on different planes of the carrying device of the LiDAR system. The LiDAR comprises an emitting device, a receiving device, a processor, a memory, a communication interface, and a communication bus. The processor, the memory, and the communication interface complete mutual communication via the communication bus.

The emitting device is configured to emit the emergent laser to a detection area.

The receiving device is configured to receive echo laser reflected by an object in the detection area.

The memory is configured to store at least one executable instruction, and the executable instruction causes the processor to execute the steps of the forgoing method for adjusting the parameters of the LiDAR, and adjust operating parameters of the emitting device.

According to another aspect of an embodiment of the present disclosure, there is provided a computer storage medium. At least one executable instruction is stored in the computer storage medium, and causes the processor to execute the steps of the forgoing method for adjusting the parameters of the LiDAR.

The embodiment of the present disclosure acquires the 3D environment information around the LiDAR, identifies the scenario type where the LiDAR is positioned and the drivable area based on the 3D environment information, determines the parameter adjusting strategy of the LiDAR according to the scenario type and the drivable area, adjusts the current operating parameters of the LiDAR based on the parameter adjusting strategy. The embodiment of the present disclosure can automatically adjust the operating parameters of the LiDAR according to different scenarios, so that the working state of the LiDAR is automatically adjusted to a working state suitable for the current scenario, thereby improving working efficiency of the LiDAR. Further, the embodiment of the present disclosure can also identify the current scenario and detect the drivable area in real time, so as to adjust the scanning range of the LiDAR to be adapted to the drivable area, which not only can improve a detection rate of an obstacle, but also can improve a utilization rate of computing resources and reduce power consumption.

The foregoing descriptions are only brief descriptions of the technical solutions in the embodiments of the present disclosure. To understand the technical means in the embodiments of the present disclosure more clearly so that the technical means can be carried out according to the content of the specification, and to make the foregoing and other objectives, characteristics and advantages of the embodiments of the present disclosure more apparent and understandable, specific implementations of the present disclosure are illustrated in detail below.

BRIEF DESCRIPTION OF DRAWINGS

By reading the detailed description of embodiments below, various other advantages and benefits become clear to the person skilled in the art. The drawings are only used for an objective of showing the embodiments, and are not considered as a limitation to the present disclosure. In addition, throughout the drawings, the same reference signs are used to represent the same or similar components.

DETAILED DESCRIPTION

The following describes embodiments of the present disclosure in a more detailed manner with reference to accompanying drawings. Although the accompanying drawings show the embodiments of the present disclosure, it should be understood that the present disclosure can be implemented in various forms and should not be limited to the embodiments described herein. On the contrary, these embodiments are provided for more thoroughly understanding of the present disclosure and educating a person of ordinary skill in the art with the scope of the present disclosure.

Figure 1:
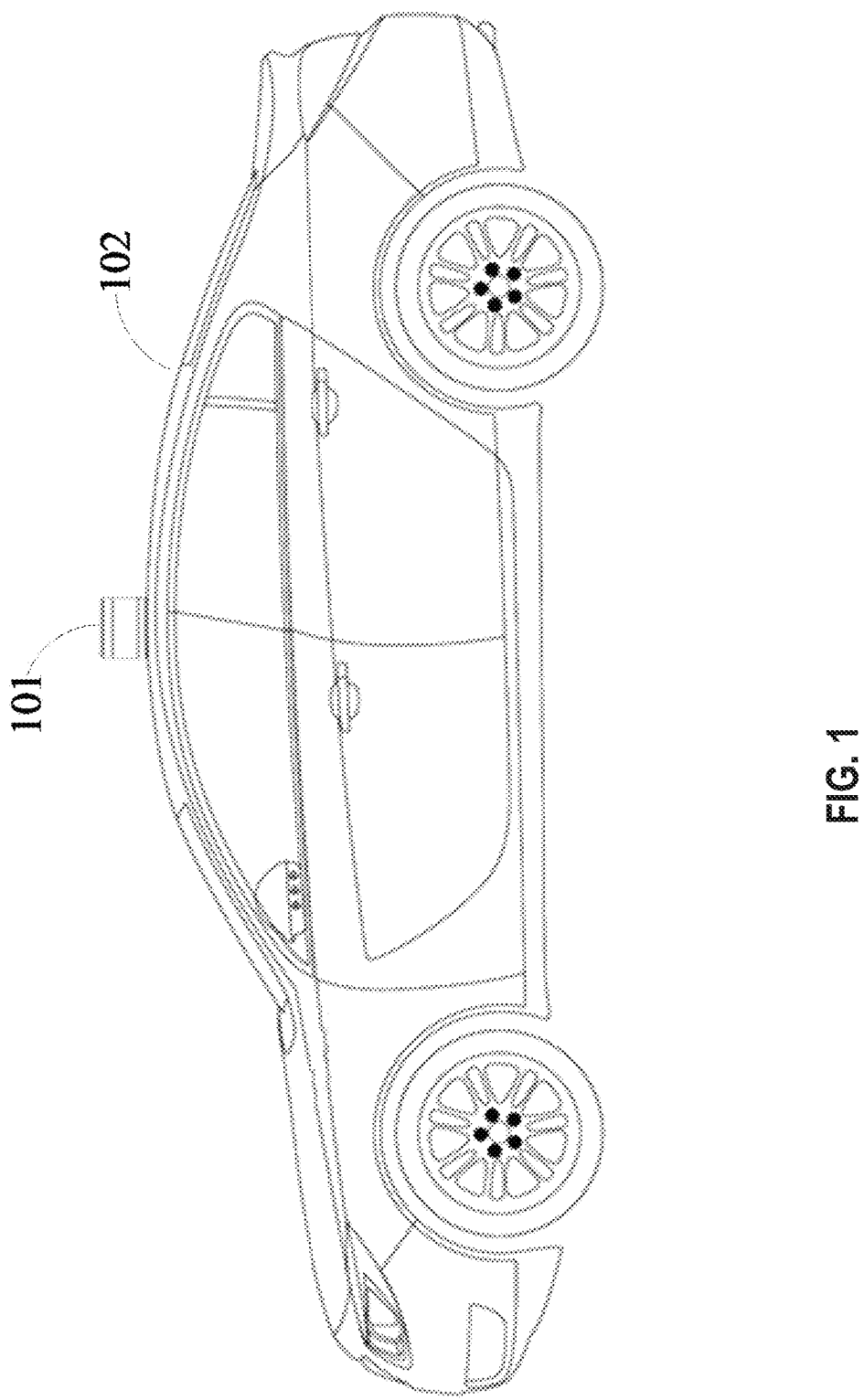
FIG. 1 shows a schematic structural diagram of an application scenario according to an embodiment of the present disclosure.

FIG. 1 shows a schematic diagram of an application scenario according to an embodiment of the present disclosure. As shown in FIG. 1, the application scenario includes a LiDAR 101 and a vehicle 102. The LiDAR 101 is mounted on various vehicles 102 that need to detect a surrounding environment. The vehicle 102 can be, for example, a car, a ship, an aircraft, or the like.

When the vehicle 102 is the car, the LiDAR can be mounted on the front, rear, roof, side of the car, or any other body position that can fix the LiDAR. It is understood that the LiDAR can also be fixed on structural platforms of other devices externally connected to the car. It can be understood that the structure platform can maintain synchronous operation with the car when the car runs.

Figure 2:
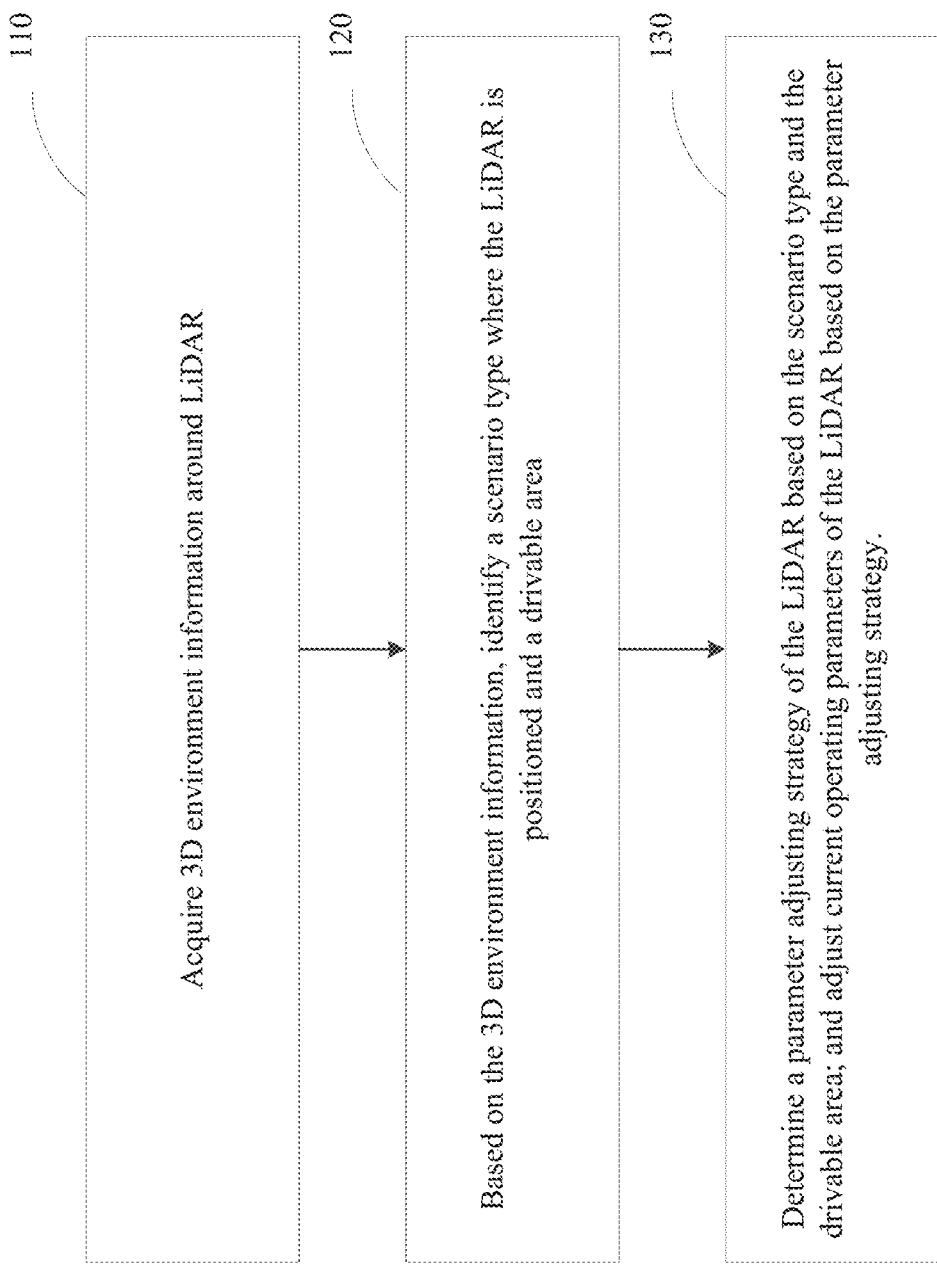
FIG. 2 shows a schematic flowchart of a method for adjusting parameters of a LiDAR according to an embodiment of the present disclosure.

FIG. 2 shows a schematic flowchart of a method for adjusting parameters of LiDAR according to an embodiment of the present disclosure. This method is applied to the LiDAR 101 in FIG. 1. As shown in FIG. 2, the method includes the following steps.

Step 110: acquiring 3D environment information around the LiDAR.

The LiDAR can be a rotary mechanical LiDAR or a solid-state LiDAR. It can be understood that when the LiDAR is the rotary mechanical LiDAR, the 3D environmental information covers a 360-degree range of field of view around the LiDAR. When the LiDAR is the solid-state LiDAR, the 3D environmental information covers a certain angular range in front of the LiDAR, for example, 120 degrees.

The 3D environment information can be 3D point cloud data. It can be understood that when the emitting laser beam of the LiDAR irradiates a surface of the object and is reflected back by the object to be received by a receiver, received laser signals are recorded in a form of points, so as to form 3D point cloud data. The 3D point cloud data can include geometric position information and reflection intensity information. The reflection intensity information is an intensity of echo collected by the receiving device of the LiDAR, and the intensity information is related to a surface material, a roughness, a direction of an incident angle of an object, emission energy of an instrument, and a laser wavelength.

It can be understood that, in some embodiments, the 3D environment information can also be combined data of the 3D point cloud data and image data. A color image is acquired via an image sensor, and then color information (RGB) of a pixel at a corresponding position is assigned with a corresponding point in a point cloud, so that the 3D point cloud data has color information, wherein the image sensor can be integrated inside the LiDAR, so that the color information corresponding to the point cloud data can be acquired before the point cloud data is output; thus, a semantic feature of a 3D environment can be identified. Optionally, the image sensor can also be independently arranged outside a LiDAR and integrates the point cloud data and the image data into the 3D environmental information. The image data can be image data or video data.

It can be understood that the 3D environment information around the LiDAR is acquired in real time.

Step 120: based on the 3D environment information, identifying a scenario type where the LiDAR is positioned and a drivable area.

The scenario type where the LiDAR is positioned is related to a field used by the LiDAR. When the LiDAR is used in different fields, a scenario in which the LiDAR is positioned is also different, so the scenario types can also include a plurality of types. When the LiDAR is applied to the car, the scenario type includes, but is not limited to, a highway scenario type, an intersection scenario type, a parking lot scenario type, etc.

Based on the 3D environment information, the step of identifying the scenario type where the LiDAR is positioned and the drivable area can specifically include:

Step 121: processing the 3D point cloud data to generate a multi-channel point cloud feature map.

The step of processing the 3D point cloud data to generate the multi-channel point cloud feature map specifically includes:

projecting the acquired 3D point cloud data onto an XY plane, and then rasterizing an area within a certain range according to the preset grid size. A grid saves different feature values to form the multi-channel feature map. Each channel in the multi-channel feature map represents a feature value of a certain dimension.

The characteristic values corresponding to a plurality of channels can include, but are not limited to, an occupancy rate, the number of points, a height of the lowest point, a height of the highest point, an average height, an average intensity, a distance, an azimuth, and so on.

In a specific implementation, a grid size can be determined to be 0.2 meters. The ranges of the front and rear, as well as left and right are each 80 meters, forming an 800×800 feature map. A plurality of combinations of the forgoing features are selected as a point cloud multi-channel feature map. For example, four features of the occupancy rate, the number of points, the average height and the average intensity are selected to form a point cloud feature map of 800×800×4 size.

Step 122: extracting high-dimensional feature information from the multi-channel point cloud feature map.

The steps of extracting the high-dimensional feature information from the multi-channel point cloud feature map specifically includes: inputting the multi-channel point cloud feature map into a first neural network. The first neural network acquires the high-dimensional feature information via a convolution operation. The high-dimensional feature information can include edge feature information, shape feature information, texture feature information, and even semantic feature, such as contour information of the car, contour information of a toll station, contour information of a traffic light, information of a road traffic sign, roadside information, lane line information, information of a pedestrian crossing, etc. It can be understood that when the 3D environment information is the combined data of the 3D point cloud data and the image data, the high-dimensional feature information extracted from the multi-channel point cloud feature map has a color feature and can be used for identification of the semantic feature, such as the road sign and the traffic light with a text or a color.

Step 123: determining the scenario type according to the high-dimensional feature information.

The step of determining the scenario type according to the high-dimensional feature information specifically includes: inputting the high-dimensional feature information into a second neural network to acquire an output value of the scenario type, matching the output value of the scenario type with the scenario type label according to a corresponding relationship between the output value of the scenario type and a scenario type label, and determining the scenario type corresponding to the output value of the scenario type to determine the scenario type where the LiDAR is positioned. It can be understood that the scenario type label includes an output value range of the scenario type corresponding to the scenario type label. It can be understood that, the step of matching the output value of the scenario type with the scenario type label according to the corresponding relationship between the output value of the scenario type and the scenario type label specifically includes: matching the output value range of the scenario type with the output value of the scenario type corresponding to the scenario type label; and when the output value of the scenario type falls within the output value range of the scenario type corresponding to the scenario type label, determining that the scenario type is the scenario type corresponding to the scenario type label.

For example, if the high-dimensional features such as a curved roadside, pedestrian crossing zebra stripes, the contour information of the traffic light, etc. are input into the second neural network, the scenario output value obtained is 9. If the output value range of the scenario type corresponding to the intersection scenario label is 7-10, the label corresponding to the scenario is an intersection scenario. For example, if the high-dimensional feature is the pedestrian crossing zebra stripes and the contour information of the traffic light, and the output value of the scenario type acquired by inputting the second neural network is 8, the scenario also falls within the scenario output value range corresponding to an intersection scenario label, and the label corresponding to the scenario is an intersection scenario.

It can be understood that the scenario type where the LiDAR is positioned is determined by the corresponding relationship between the output value of the scenario type and the scenario type label, which increases determination accuracy of the scenario type.

In another feasible embodiment, the steps of inputting the high-dimensional feature information into the second neural network to acquire the output value of the scenario type can specifically include: inputting the high-dimensional feature information into the second neural network, and matching the high-dimensional feature information with the feature information in a model library of the second neural network, where it can be understood that the feature information in the model library of the second neural network has a feature value and a weight value; and according to the matched feature value and the weight value, acquiring the output value of the scenario type.

Step 124: determining the drivable area according to the high-dimensional feature information.

The step of determining the drivable area according to the high-dimensional feature information specifically includes: inputting the high-dimensional feature information into a third neural network to acquire an output map of the drivable area, matching the output map of the drivable area with a drivable area label according to a corresponding relationship between the output map of the preset drivable area and the drivable area label, and determining the drivable area corresponding to the output map of the drivable area to determine the drivable area.

It can be understood that the step of inputting the high-dimensional feature information into the third neural network to acquire the output map of the drivable area can include: inputting the high-dimensional feature information into the third neural network, and extracting, by the third neural network, a feature of the drivable area, where the feature of the drivable area can include, for example, the roadside information, the lane line information, etc.; extracting an area containing the feature of the drivable area to generate the output map of the drivable area.

It can be understood that the drivable area labels in different scenarios can be different. For example, a drivable area label of a highway can be a label containing the lane line information; a drivable area label of an intersection can include the roadside information and the lane line information; a drivable area label of a parking lot can include parking line information, and so on.

The step of matching the output map of the drivable area with the drivable area label to determine the drivable area can include: matching the output map of the drivable area with the drivable area label, determining the scenario where the output map of the drivable area is positioned, and determining the drivable area according to the scenario.

After the step of matching the output map of the drivable area with the drivable area label to determine the drivable area, the method further includes: acquiring information of an obstacle in the drivable area, determining the complexity of the drivable area according to the information of the obstacle; and if the complexity of the drivable area exceeds a preset threshold, reacquiring the drivable area.

Figure 3A:
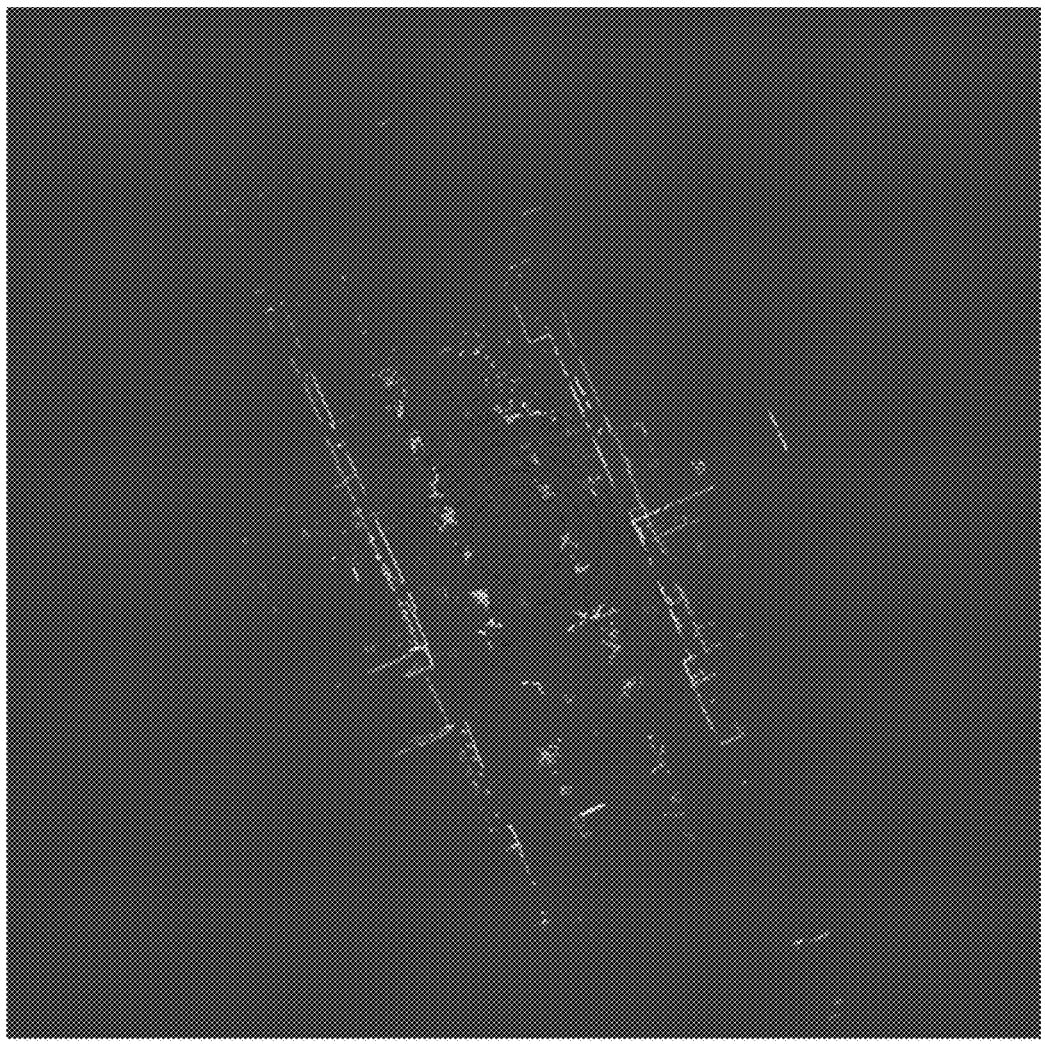
FIGS. 3a-3c show point cloud feature maps at different stages of data processing according to an embodiment of the present disclosure.
Figure 3B:
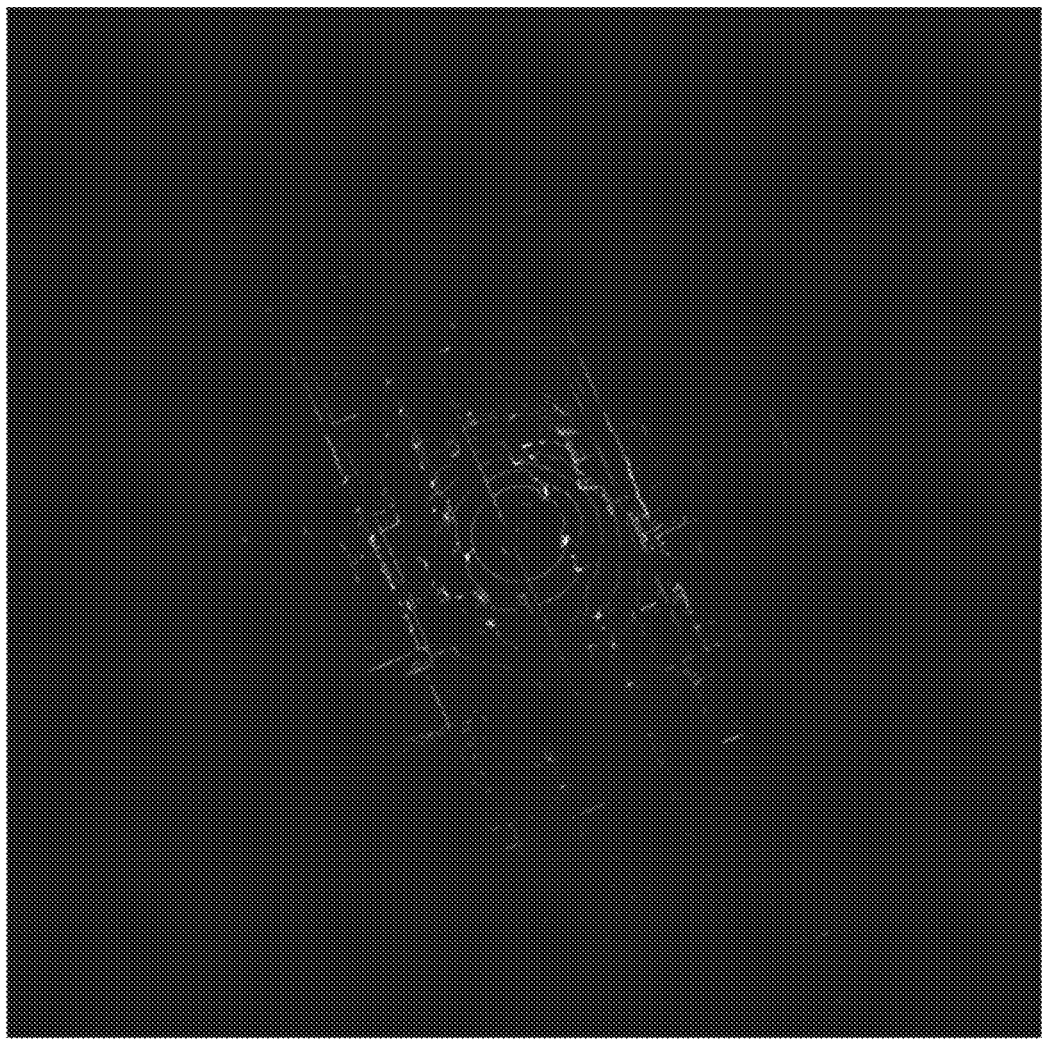
Figure 3C:
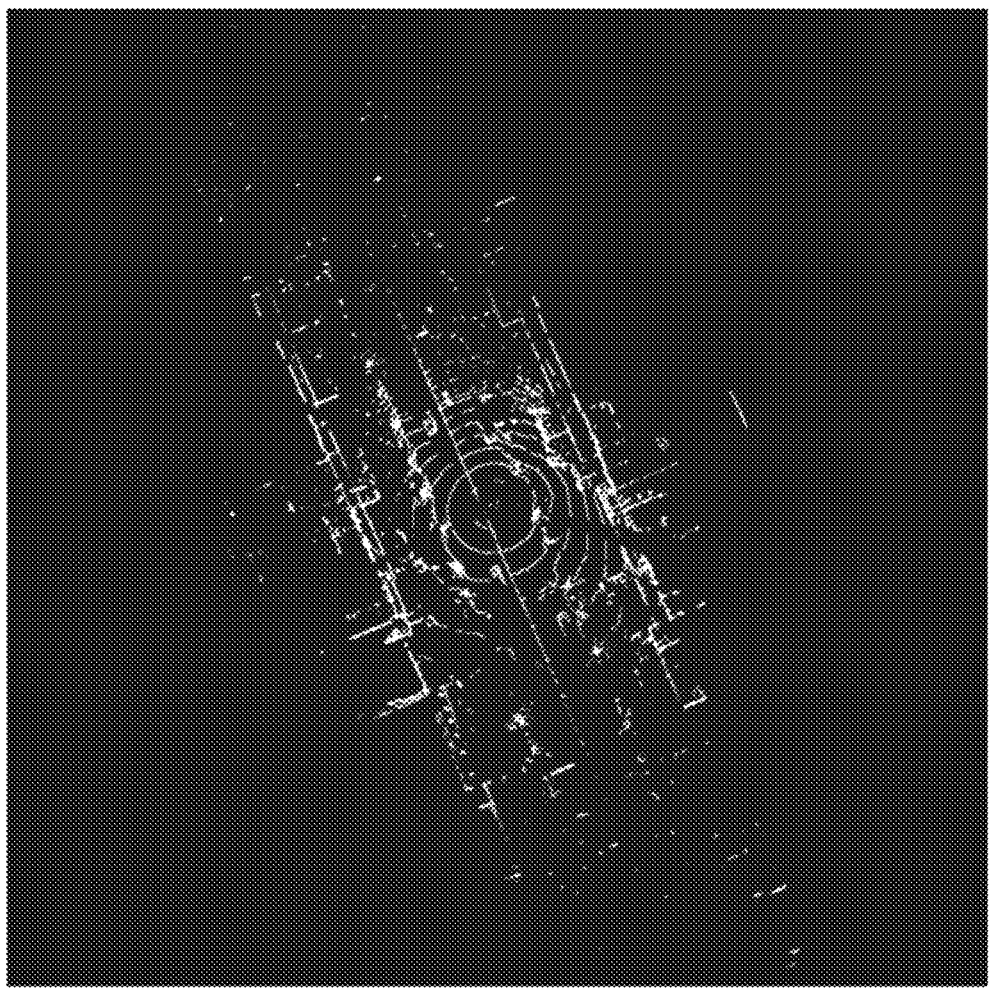

It can be understood that the first neural network and the second neural network each consist of a convolutional layer and a pooling layer, and the third neural network consists of a deconvolutional layer. The high-dimensional feature information is an intermediate variable, which is acquired by the first neural network via a convolution operation, and is input into the second neural network and the third neural network, respectively. For example, FIGS. 3a-3c show the point cloud feature maps at different processing stages, where FIG. 3a is the point cloud feature map (original 3D point cloud data) at an early stage of data processing. FIG. 3b is the point cloud feature map at a middle stage of the data processing (output after the first neural network). FIG. 3c is the point cloud feature map after the data processing is completed (output after the second neural network).

Since a basic operation of the neural network is the convolution operation, which consists of a series of multiplication and addition operations, in order to introduce a nonlinear transformation, a nonlinear activation function is added to the neural network. Commonly used nonlinear activation functions include ReLU, Sigmoid, etc.

Optionally, in some embodiments, before step 120, the method further includes: acquiring trained point cloud data, where the trained point cloud data include original point cloud data, and the scenario type label and the drivable area label that correspond to the original point cloud data; and according to the original point cloud data, and the scenario type label and the drivable area label that correspond to the original point cloud data, training the first neural network, the second neural network, and the third neural network.

The original point cloud data can be acquired by a vehicle-mounted LiDAR, and the scenario type label and the drivable area label that correspond to the original point cloud data can be acquired by manual labeling. The larger the amount of the original point cloud data in a trained set formed by the original point cloud data, the more accurate the neural network acquired by training.

Figure 4:
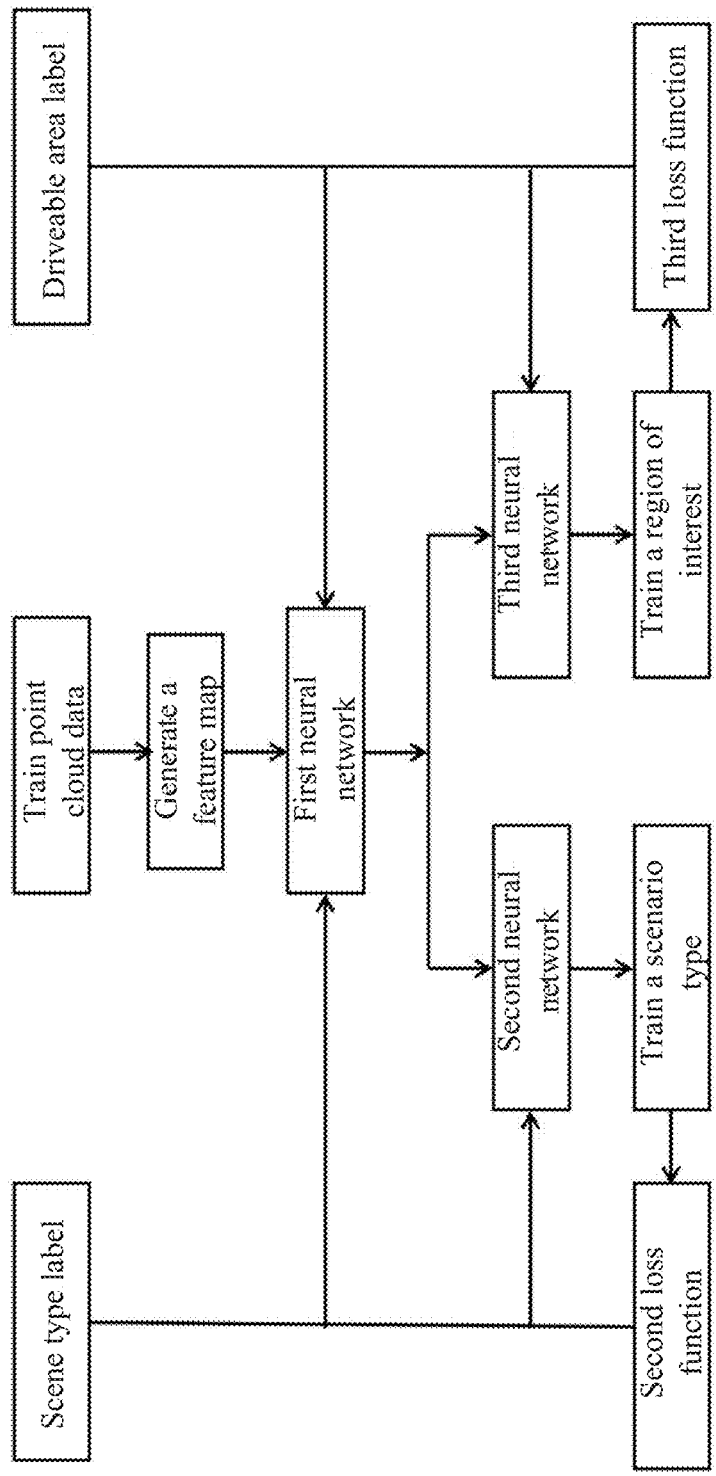
FIG. 4 shows a schematic flowchart of a neural network training process according to an embodiment of the present disclosure.

As shown in FIG. 4, the step of training the first neural network, the second neural network, and the third neural network can specifically include: acquiring initialization parameters of the first neural network, the second neural network, and the third neural network, respectively; generating a trained point cloud feature map from the original point cloud data in the trained point cloud data; inputting the training point cloud feature map into the first neural network, the second neural network, and the third neural network; acquiring the trained scenario type output by the second neural network and a trained area of interest output by the third neural network; comparing the trained scenario type with the scenario type label; calculating a loss value of the scenario type via a second loss function; comparing the trained area of interest with the drivable area label; calculating a loss value of the drivable area via a third loss function; updating parameters of the first neural network, the second neural network, and the third neural network via a back propagation algorithm based on the loss value of the scenario type and the loss value of the drivable area; and when the loss value of the scenario type and the loss value of the drivable area no longer changes, stopping training and saving a final parameter value of the neural network.

Step 130: determining a parameter adjusting strategy of the LiDAR based on the scenario type and the drivable area; and adjusting current operating parameters of the LiDAR based on the parameter adjusting strategy.

In this embodiment, the current operating parameters of the LiDAR include, but are not limited to, one or more of a vertical angle of field of view of an emitting laser beam of the LiDAR, a horizontal angle of field of view of the emitting laser beam of the LiDAR, a direction of an optical axis of the emitting laser beam of the LiDAR, a scanning density of the LiDAR, a scanning frequency of the LiDAR, and a pulse transmitting power of the LiDAR.

Step 130 can specifically include:

Step 131: according to the scenario type, determining scenario parameter adjusting strategies of one or more of the horizontal angle of field of view of the LiDAR, the vertical angle of field of view of the LiDAR, the direction of the optical axis of the emitting laser beam of the LiDAR, the scanning density of the LiDAR, the scanning frequency of the LiDAR, and the pulse emitting power of the LiDAR.

The scenario parameter adjusting strategy and the corresponding relationship between the scenario type and the scenario parameter adjusting strategy are preset by the user according to the scenario type.

Figure 5A:
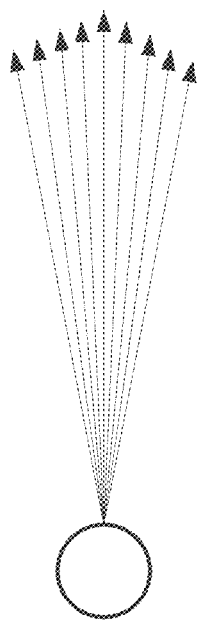
FIG. 5a shows a schematic diagram of an optical path for reducing a vertical angle of field of view of an emitting laser beam of a LiDAR according to an embodiment of the present disclosure.
Figure 5A:
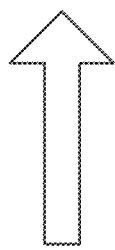
Figure 5A:
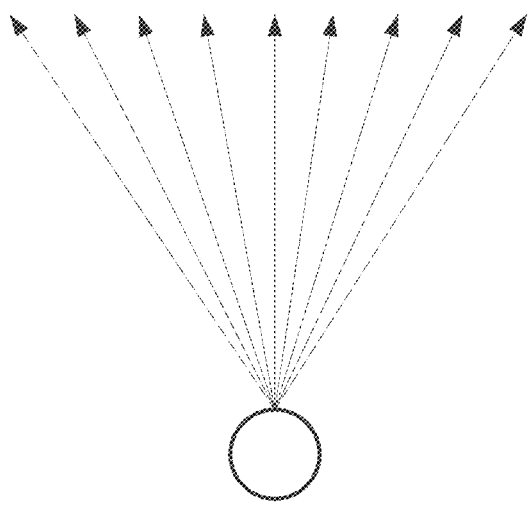

For example, when the car loaded with a LiDAR drives in the highway scenario, the LiDAR is required to focus the scanning range in the front and rear road areas, reducing detection of the left and right sides of the car, and ignoring or reducing detection outside the drivable area. Reducing a detection range not only saves computing power, but also improves a rate of obstacle detection in a key area. Therefore, in some embodiments, when the scenario type is detected as the highway scenario type, the vertical angle of field of view of the LiDAR is reduced, the pulse emitting frequency of the emitting laser beam of the LiDAR is reduced, and the scanning frequency of the LiDAR is increased. Reducing the vertical angle of field of view of the emitting laser beam by, for example, as shown in FIG. 5a, compressing the vertical angle of field of view by 20% or adjusting the vertical angle of field of view of the LiDAR from +15°~−25° to +12°~−20° can concentrate more beams in a horizontal direction and increase the front and back detection distance of the LiDAR, so as to detect a long-distance object. Reducing the pulse emitting frequency by, for example, adjusting the pulse emitting frequency from 50,000 shots per second to 10,000 shots per second can increase charging time of a pulse laser transmitter and increase laser energy, so as to detect an object at a farther distance. Increasing the scanning frequency by, for example, adjusting the scanning frequency from 10 Hz to 15 Hz can detect changes of a moving object more quickly, so as to improve safety of automatic driving.

Figure 5B:
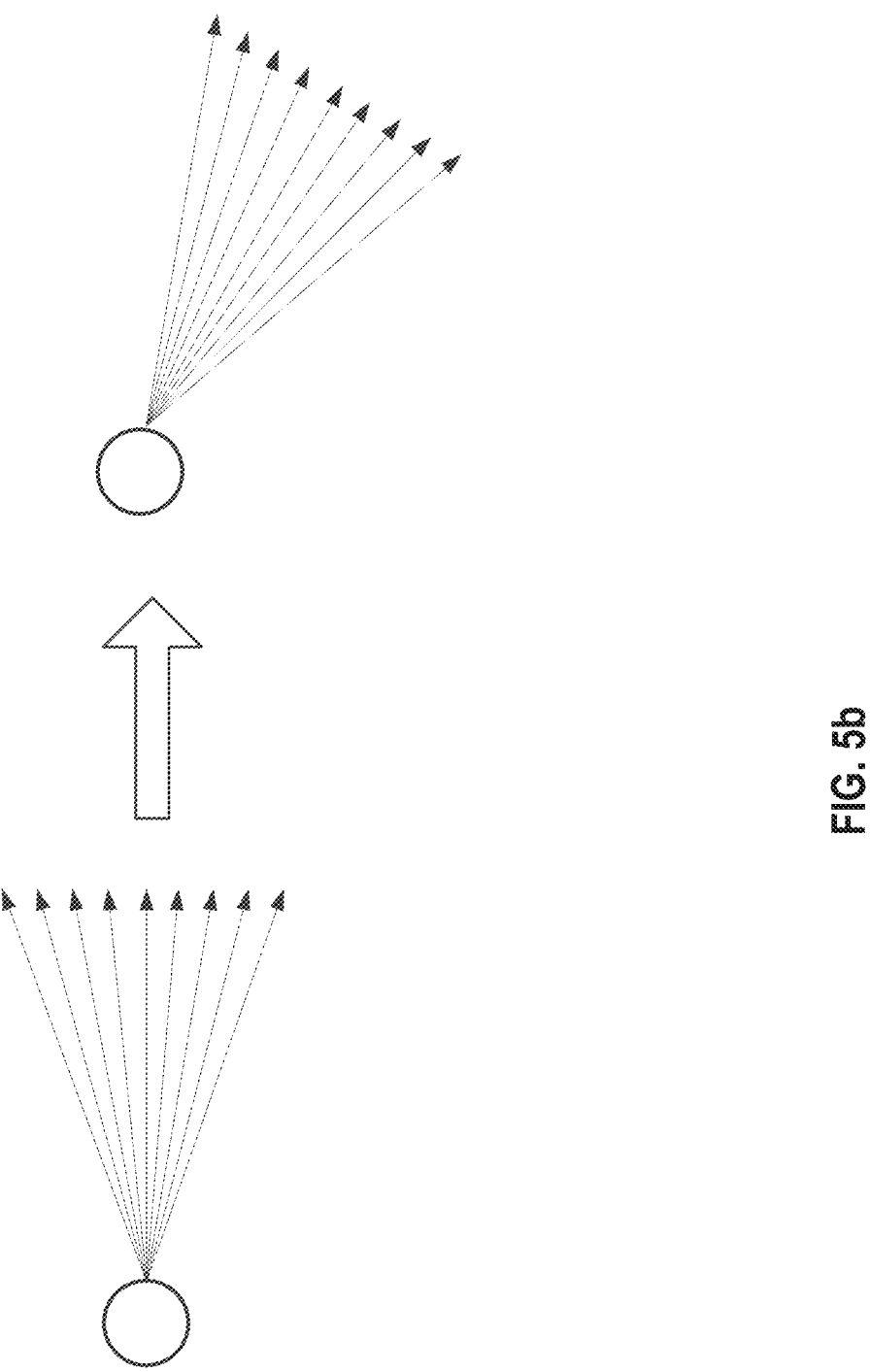
FIG. 5b shows a schematic diagram of an optical path for reducing a direction of an optical axis of an emitting laser beam of a LiDAR according to an embodiment of the present disclosure.

For example, when the car loaded with the LiDAR is positioned in the intersection scenario and passes through an intersection, an object in the surrounding environment moves quickly, and it is necessary to detect changes of the moving object faster at this time. When the scenario type is detected as the intersection scenario type, it is necessary to reduce the front and rear detection distances and increase the detection of close distances around the car so as to detect changes of the moving object more quickly. Therefore, in some embodiments, when the intersection scenario is detected, the pulse emitting frequency of the LiDAR is increased, the direction of the optical axis of the emitting laser beam of the LiDAR is reduced, and the scanning frequency of the LiDAR is increased. Increasing the pulse emitting frequency of the LiDAR by, for example, adjusting the pulse emitting frequency from 10,000 shots per second to 50,000 shots per second can acquire the changes of the surrounding moving objects more quickly. If the direction of the optical axis of the emitting laser beam is reduced by, for example, as shown in FIG. 5b, moving down the direction of the optical axis of the emitting laser beam by 20° (in a specific application, deflecting the direction of the optical axis of the emitting laser beam from 0° (that is, horizontal emission) to downward 20°), a detection range of the emitting laser beam is closer to the ground, which can reduce the detection range of the LiDAR, thereby focusing on detecting a short-range object. Increasing the scanning frequency of the LiDAR by, for example, adjusting the scanning frequency from 10 Hz to 15 Hz can detect the changes of the moving object more quickly.

For example, when the car loaded with the LiDAR enters a static scenario, such as a parking lot, or waits for parking, the power consumption of the LiDAR can be reduced when the surroundings are unchanged. Therefore, in some embodiments, when the parking lot scenario type is detected, the pulse emitting frequency of the LiDAR is reduced, the direction of the optical axis of the emitting laser beam of the LiDAR is reduced, and the scanning frequency of the LiDAR is reduced. Reducing the scanning frequency of the LiDAR by, for example, adjusting the scanning frequency from 15 Hz to 10 Hz can reduce the power consumption of the LiDAR.

Step 132: according to the drivable area, adjusting the scenario parameter adjusting strategy, determining the adjusted scenario parameter adjusting strategy as the parameter adjusting strategy of the LiDAR, and adjusting the current operating parameters of the LiDAR based on the parameter adjusting strategy.

Step 132 can specifically include:

Step 1321: according to the scenario type, acquiring a standard driving area in the scenario type and driving parameter adjusting strategies of the horizontal angle of field of view of the LiDAR and the vertical angle of field of view of the LiDAR that correspond to the standard driving area.

If the corresponding relationship between the scenario type and the standard driving area is preset, the standard driving area under the current scenario type can be searched in the corresponding relationship between the scenario type and the standard driving area according to the current scenario type. For example, if a standard driving area corresponding to the highway scenario type is preset as a specific straight road area, the scenario type is determined as the highway scenario type, and the corresponding standard driving area is searched as the specific straight road area. At the same time, the corresponding relationship among the scenario type, the standard driving area, and the driving parameter adjusting strategy is provided. Ideally, the drivable area of a certain scenario type is the standard driving area. Preset standard parameters of an angle of field of view should be set according to the standard driving area. However, the actually determined drivable area cannot exactly coincide with the standard driving area. Therefore, by presetting the corresponding relationship between the standard driving area and the parameter adjusting strategies of the horizontal angle of field of view of the LiDAR and the vertical angle of field of view of the LiDAR, the driving parameter adjusting strategies of the horizontal angle of field of view of the LiDAR and the vertical angle of field of view of the LiDAR corresponding to the acquired standard driving area can be searched in the corresponding relationship between the standard driving area and the driving parameter adjusting strategies of the horizontal angle of field of view of the LiDAR and the vertical angle of field of view of the LiDAR, according to the acquired standard driving area.

Step 1322: matching the drivable area with the standard driving area, and readjusting the scenario parameter adjusting strategy according to matching results and the driving parameter adjusting strategy.

Figure 6A:
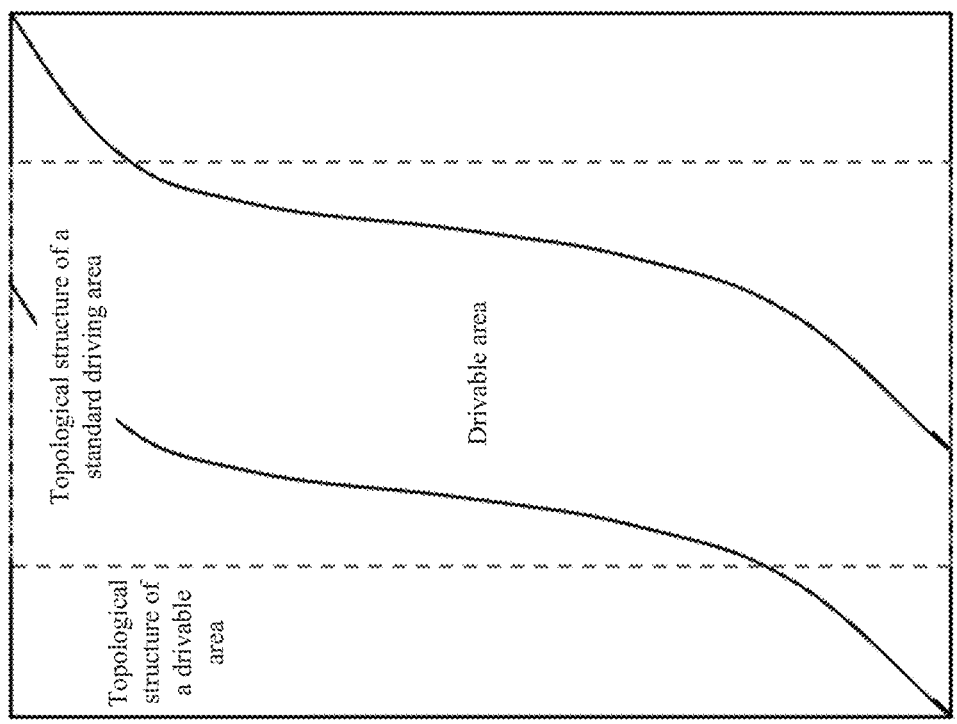
FIGS. 6a and 6b show the schematic diagrams of a topological structure of a drivable area according to an embodiment of the present disclosure.
Figure 6B:
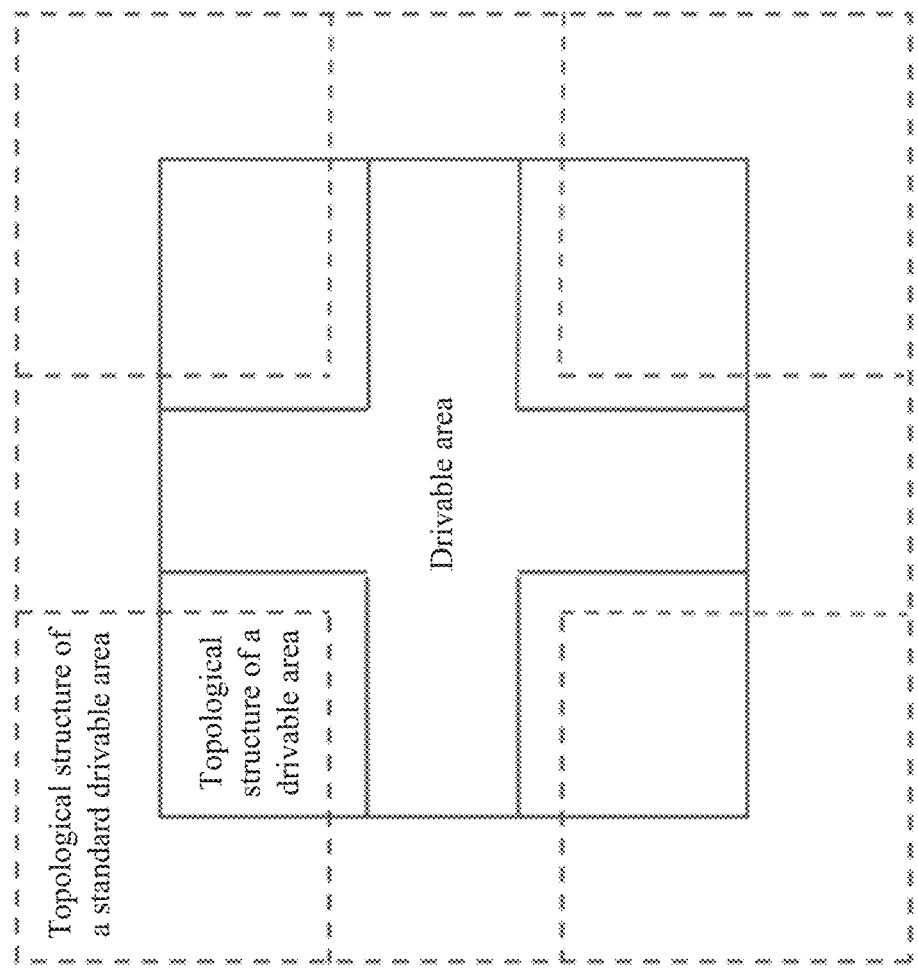

In some embodiments, the steps of matching the standard driving area with the drivable area, and adjusting the scenario parameter adjusting strategy according to the matching results and the driving parameter adjusting strategy specifically include: analyzing a topological structure of the drivable area and a topological structure of the standard driving area; calculating a topological correlation between the topological structure of the drivable area and the topological structure of the standard driving area; determining a scenario difference coefficient of the drivable area relative to the standard driving area according to the topological correlation, where the scenario difference coefficient includes a translation difference coefficient, a rotation difference coefficient, a scaling difference coefficient, etc.; and adjusting the scenario parameter adjusting strategy according to the scenario difference coefficient and the driving parameter adjusting strategy. In some embodiments, the step of adjusting the scenario parameter adjusting strategy according to the scenario difference coefficient and the driving parameter adjusting strategy specifically includes: acquiring a standard parameter of an angle of field of view (including a standard parameter of the vertical angle of field of view and a standard parameter of the horizontal angle of field of view) in the driving parameter adjusting strategy; according to the scenario difference coefficient and based on the standard parameter of the angle of field of view, calculating in an equal proportion a parameter of a new angle of field of view (including a new vertical angle of field of view and a new horizontal angle of field of view); and according to the parameter of the new angle of field of view, adjusting the vertical angle of field of view and the horizontal angle of field of view in the scenario parameter adjusting strategy. For example, as shown in FIG. 6a, it is assumed that the center of the topological structure of the drivable area and the topological structure of the standard driving area are coincident, sides thereof are parallel, a width thereof is the same, and a ratio of lengths is 5:3. Then it is determined that the topological structure of the drivable area and the topological structure of the standard driving area has a translation difference coefficient of 0, a rotation difference coefficient of 0, and a scaling difference coefficient of (5/3)*1. For another example, as shown in FIG. 6b, it is assumed that the center of the topological structure of the drivable area and the topological structure of the standard driving area are coincident, the sides thereof are parallel, a ratio of the widths thereof is 6:4, and a ratio of the lengths is 5:4. Then it is determined that the topological structure of the drivable area and the topological structure of the standard driving area has the translation difference coefficient of 0, the rotation difference coefficient of 0, and the scaling difference coefficient of (6/4)*(6/4). Optionally, in some other embodiments, when the centers of the topological structure of the drivable area and the topological structure of the standard driving area are not coincident or the sides thereof are not parallel, the topological structure of the standard driving area can be kept unchanged. The topological structure of the driving area is rotated and translated until the centers of the topological structure of the drivable area and the topological structure of the standard driving area are coincident and the sides thereof are parallel. The translation difference coefficient and the rotation difference coefficient are recorded. Then the topological structure of the drivable area and a proportional relationship between the length and width of the topological structure of the standard driving area are calculated, and the scaling difference coefficient is determined.

When the translation difference coefficient, the rotation difference coefficient, and the scaling difference coefficient are calculated, the parameter of the new angle of field of view can be calculated according to the translation difference coefficient, the rotation difference coefficient, and the scaling difference coefficient. For example, when the translation difference coefficient, the rotation difference coefficient, and the scaling difference coefficient are calculated, a magnification of the angle of field of view can be calculated according to the translation difference coefficient, the rotation difference coefficient, the scaling difference coefficient, and a proportional relationship between the sides of similar graphics. In this way, the parameter of the new angle of field of view is calculated, so that when the parameter of the new angle of field of view is adjusted, a detection range of the LiDAR can completely cover the standard driving area. For another example, when the translation difference coefficient, rotation difference coefficient, and scaling difference coefficient are calculated, the direction of the optical axis of the emitting laser beam of the LiDAR can be adjusted according to the rotation difference coefficient, so that the direction of the optical axis of the adjusted laser beam emitted by the LIDAR is parallel to the central axis of the topological structure of the standard driving area. The magnification of the angle of field of view can be calculated according to the translation difference coefficient, the rotation difference coefficient, the scaling difference coefficient, and the proportional relationship between the sides of similar graphics. In this way, the parameter of the new angle of field of view is calculated, so that when the parameter of the new angle of field of view is adjusted, the detection range of the LiDAR can completely cover the standard driving area.

It can be understood that after the state of the LiDAR is adjusted, the difference coefficient is calculated again according to the forgoing method based on the new detection range and the drivable area, and the parameter of the angle of field of view (the parameters of the vertical angle of field of view and the horizontal angle of field of view) is further adjusted on this basis.

Step 1323: adjusting the current operating parameters of the LiDAR based on the adjusted scenario parameter adjusting strategy.

It should be noted that the parameter adjusting range or the preset adjusted parameter value cannot exceed an executable range of the LiDAR. In some embodiments, when the parameter adjusting range or the preset adjusted range exceeds the executable range of the LiDAR, it is prompted to re-adjust a monitoring area.

Figure 7:
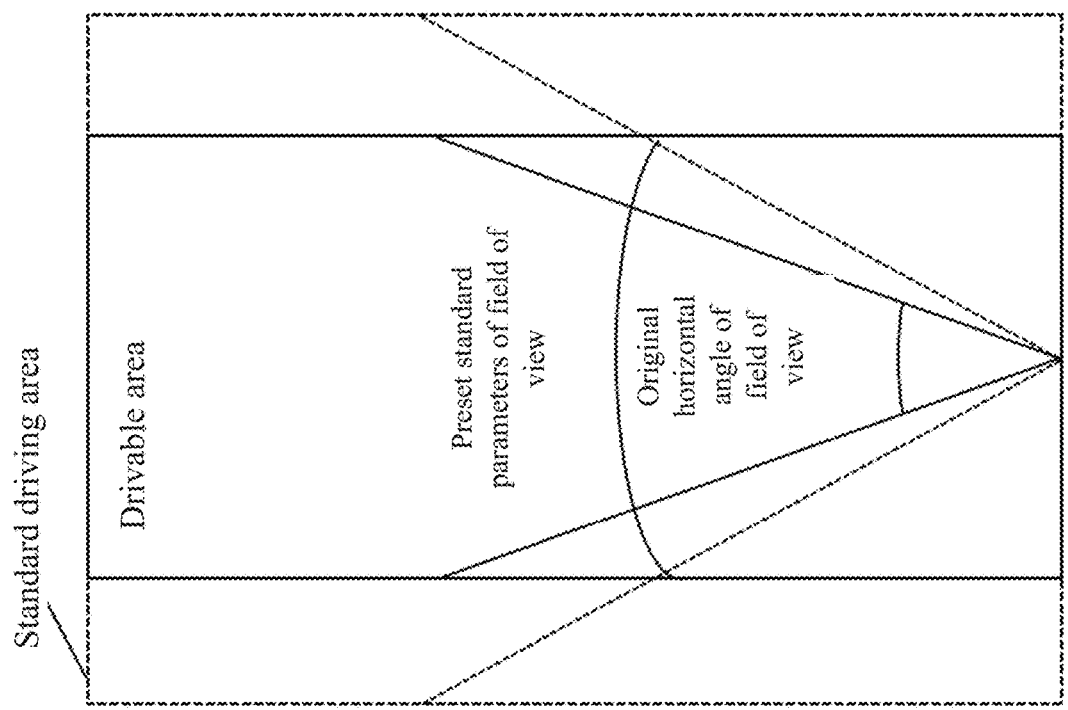
FIG. 7 shows a schematic diagram of a detection range of a LiDAR before and after parameter adjustment according to an embodiment of the present disclosure.

For example, the step of determining the scenario parameter adjusting strategy that matches the highway scenario type includes: compressing the vertical angle of field of view of the emitting laser beam of the LiDAR from +45° to 40°, adjusting the pulse emitting frequency of the emitting laser beam of the LiDAR from 50,000 shots per second to 10,000 shots per second, and adjusting the scanning frequency of the LiDAR from 10 Hz to 15 Hz. The driving parameter adjusting strategy that matches the highway scenario type includes: the horizontal angle of field of view is 120°, and the vertical angle of field of view is 35°. It is assumed that the topological correlation between the topological structure of the drivable area and the topological structure of the standard driving area is that the centers thereof are coincident, the sides thereof are parallel, the widths thereof are the same, and the ratio of the lengths thereof is 3:5, that is, the translation difference coefficient is 0, the rotation difference coefficient is 0, and the scaling difference coefficient is (3/5)*1. Then the new horizontal angle of field of view is (3/5)*120°=72°, and the new vertical angle of field of view is 35° (as shown in FIG. 7). Finally, the adjusted scenario parameter adjusting strategy includes: adjusting the horizontal angle of field of view of the emitting laser beam of the LiDAR to 72°, adjusting the vertical angle of field of view of the emitting laser beam of the LiDAR to 35°, adjusting the pulse emitting frequency of the emitting laser beam of the LiDAR from 50,000 shots per second to 10,000 shots per second, and adjusting the scanning frequency of the LiDAR from 10 Hz to 15 Hz.

For example, the step of determining the scenario parameter adjusting strategy that matches the intersection scenario type includes: adjusting the pulse emitting frequency from 10,000 shots per second to 50,000 shots per second, moving downward the direction of the optical axis of the emitting laser beam by 20°, and adjusting the scanning frequency from 10 Hz to 15 Hz. The driving parameter adjusting strategy that matches the intersection scenario type includes: the horizontal angle of field of view is 120°, and the vertical angle of field of view is 90°. It is assumed the topological correlation of the topological structure of the drivable area and the topological structure of the standard driving area is that the centers thereof are coincident, the sides thereof are parallel, the ratio of the widths thereof is 6:4, and the ratio of the lengths thereof is 6:4, that is, the translation difference coefficient is 0, the rotation difference coefficient is 0, the scaling difference coefficient is (6/4)*(6/4), and the new horizontal angle of field of view is calculated as (6/4)*120°=180°. Then the new vertical angle of field of view is (6/4)*90°=135°. Finally, the adjusted scenario parameter adjusting strategy includes: adjusting the horizontal angle of field of view of the emitting laser beam of the LiDAR to 180°, adjusting the vertical angle of field of view of the emitting laser beam of the LiDAR to 135°, adjusting the pulse emitting frequency from 10,000 shots per second to 50,000 shots per second, moving downward the direction of the optical axis of the emitting laser beam by 20°, and adjusting the scanning frequency from 10 Hz to 15 Hz.

For example, the step of determining the scenario parameter adjusting strategy that matches the parking lot scenario type includes: adjusting the pulse emitting frequency of the emitting laser beam of the LiDAR from 50,000 shots per second to 10,000 shots per second, moving downward the direction of the optical axis of the emitting laser beam of the LiDAR by 20°, and reducing the scanning frequency from 15 Hz to 10 Hz. The driving parameter adjusting strategy that matches the parking lot scenario type includes: the horizontal angle of field of view is 120°, and the vertical angle of field of view is 60°. It is assumed that the topological correlation between the topological structure of the driving area and the topological structure of the standard driving area is that the centers thereof are coincident, the sides thereof are parallel, the ratio of the widths thereof is 1:2, and the ratio of the lengths thereof is 1:2, that is, the translation difference coefficient is 0, the rotation difference coefficient is 0, and the scaling difference coefficient is (1/2)*(1/2), then the new horizontal angle of field of view is calculated as (1/2)*120°=60°, and the new vertical angle of field of view is (1/2)*60°=30°. Finally, the adjusted scenario parameter adjusting strategy includes: adjusting the horizontal angle of field of view of the emitting laser beam of the LiDAR to 60°, adjusting the vertical angle of field of view of the emitting laser beam of the LiDAR to 30°, adjusting the pulse emitting frequency of the emitting laser beam of the LiDAR from 50,000 shots per second to 10,000 shots per second, reducing the direction of the optical axis of the emitting laser beam of the LiDAR by 20°, and reducing the scanning frequency from 15 Hz to 10 Hz.

The embodiment of the present disclosure acquires the 3D environment information around the LiDAR to identify the scenario type where the LiDAR is positioned and the drivable area based on the 3D environment information, determine the parameter adjusting strategy of the LiDAR according to the scenario type and the drivable area, and adjust the current operating parameters of the LiDAR based on the parameter adjusting strategy. The embodiment of the present disclosure can automatically adjust the operating parameters of the LiDAR according to different scenarios, so that the working state of the LiDAR is automatically adjusted to a working state suitable for the current scenario, thereby improving working efficiency of the LiDAR. Further, the embodiment of the present disclosure can also identify the current scenario and detect the drivable area in real time, so as to adjust the scanning range of the LiDAR to be adapted to the drivable area, which not only can improve a detection rate of an obstacle, but also can improve a utilization rate of computing resources and reduce power consumption.

Figure 8A:
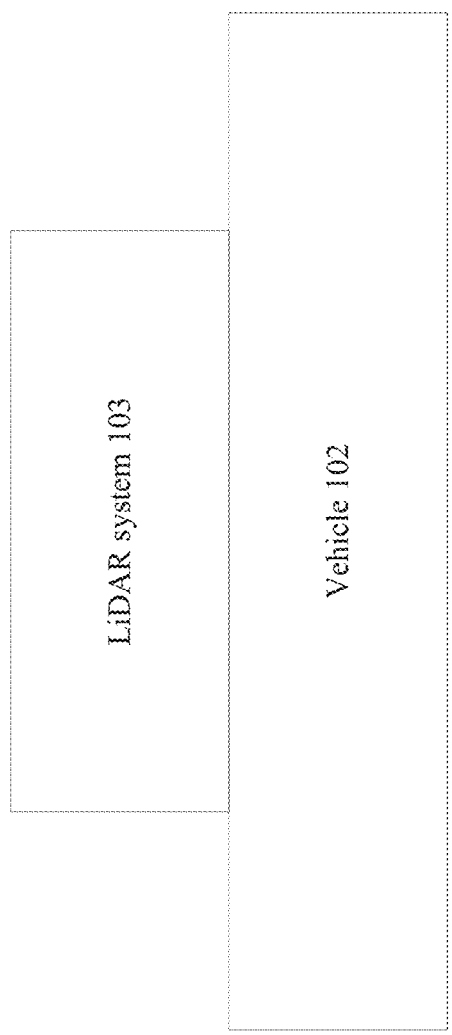
FIG. 8a shows a schematic structural diagram of an application scenario according to another embodiment of the present disclosure.

FIG. 8a shows a schematic structural diagram of an application scenario according to another embodiment of the present disclosure. As shown in FIG. 8a, the application scenario includes a LiDAR system 103 and a vehicle 102. The LiDAR system 103 is mounted on various vehicles 102 that need to detect the surrounding environment. The vehicle 102 can be a vehicle, a ship, an aircraft, or the like.

Figure 8B:
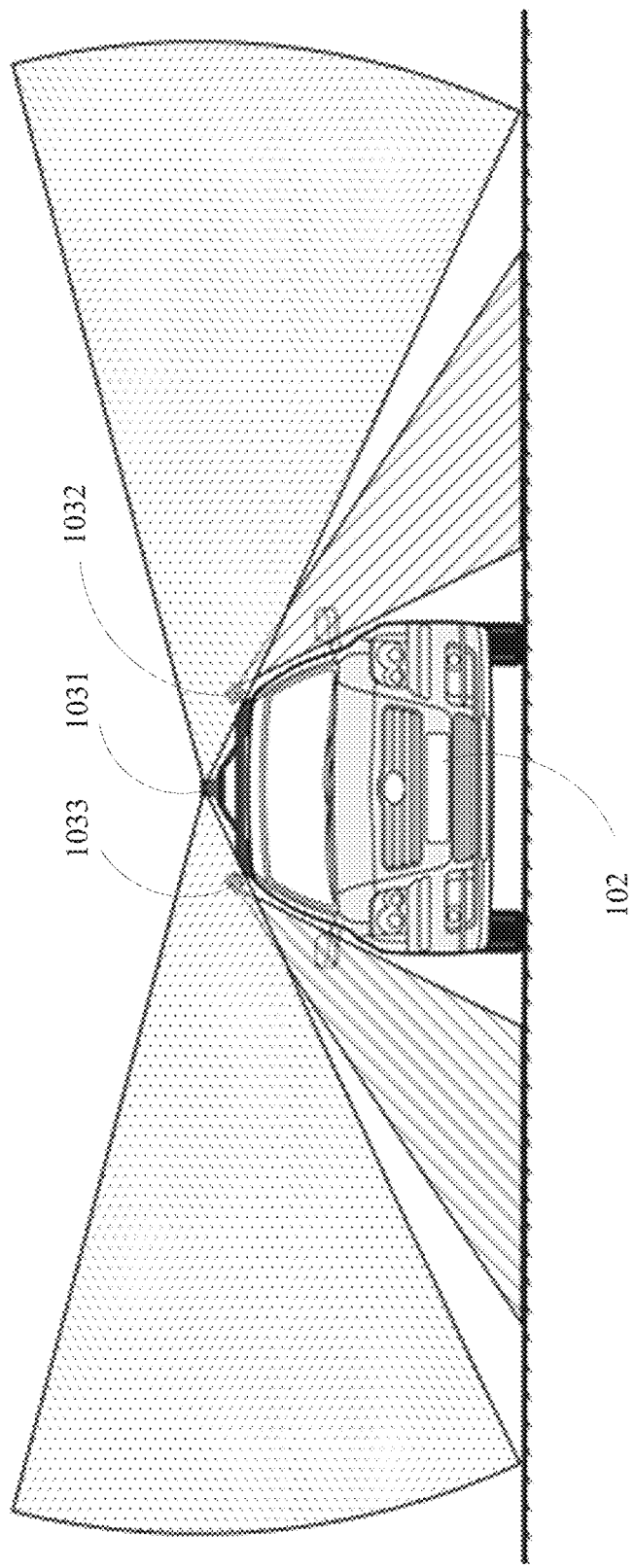
FIG. 8b shows a schematic diagram of an application scenario including three LiDARs according to another embodiment of the present disclosure.
Figure 8C:
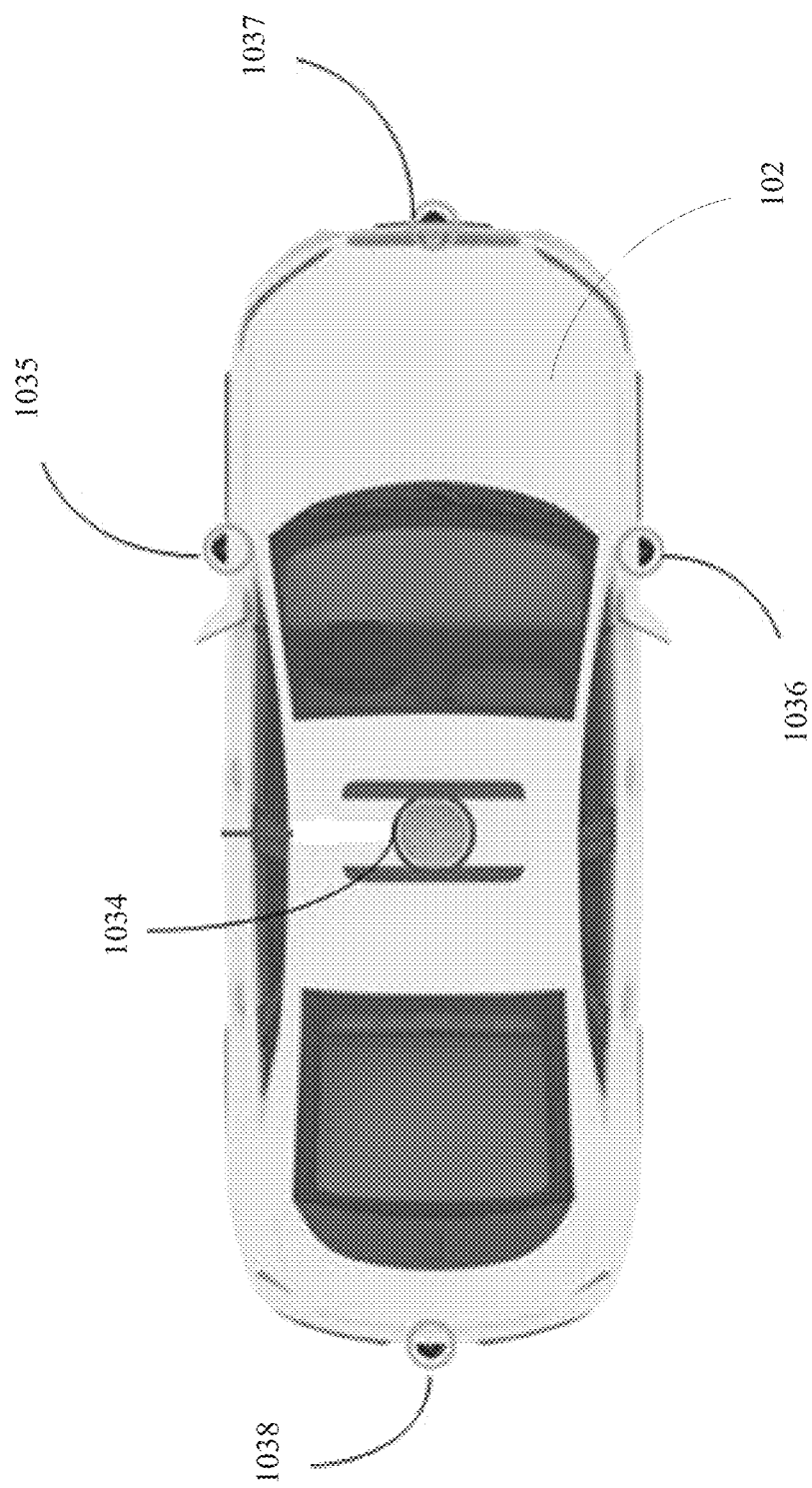
FIG. 8c shows a schematic diagram of an application scenario including five LiDARs according to another embodiment of the present disclosure.

The LiDAR system 103 includes a plurality of LiDARs. The plurality of LiDARs can be arranged on the same plane or on different planes. When the vehicle 102 is a car, the LiDAR can be mounted at one or more places in the front, the rear, and the roof of the vehicle. For example, as shown in FIG. 8b, the LiDAR system 103 includes three LiDARs. Three LiDARs 1031, 1032 and 1033 are all arranged on the roof of the car. The LiDAR 1031 is positioned in the center of the roof of the car. The LiDARs 1032 and 1033 are positioned on opposite sides of the roof of the car. The LiDAR 1031 can be configured to acquire environmental information around the car and far away from the car. The LiDARs 1032 and 1033 are configured to acquire environmental information on the left and right sides of the car and close to the car, respectively. For another example, as shown in FIG. 8c, the LiDAR system 103 includes five LiDARs. The LiDAR 1034 is arranged on the roof of the car and positioned in the center of the roof of the car. The LiDARs 1035 and 1036 are arranged on the left and right sides of the car and are positioned around a rearview mirror. The LiDAR 1037 is arranged at the front of the car. The LiDAR 1038 is arranged at the rear of the car.

Figure 9:
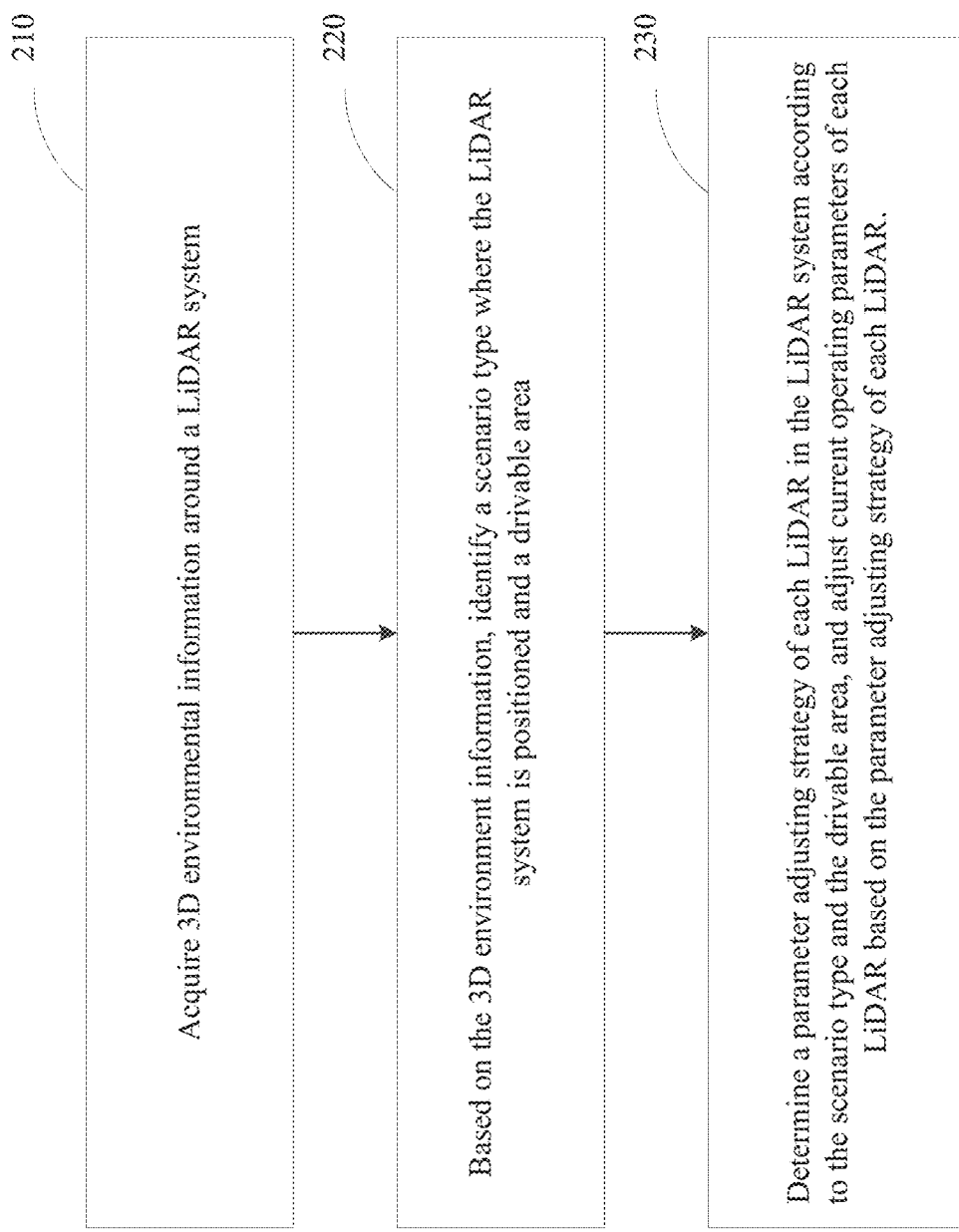
FIG. 9 shows a schematic flowchart of a method for adjusting parameters of a LiDAR according to another embodiment of the present disclosure.

FIG. 9 shows a schematic flowchart of a method for adjusting parameters of a LiDAR according to another embodiment of the present disclosure. This method is applied to the LiDAR system 103 in FIGS. 8a-8c. As shown in FIG. 9, the method includes the following steps.

Step 210: acquiring 3D environment information around the LiDAR system.

The specific implementation of step 210 is substantially the same as that of step 110 in the foregoing embodiments. In this embodiment, one LiDAR in the LiDAR system is used to acquire the 3D environment information around the LiDAR system, or the plurality of LiDARs in the LiDAR system can be used to acquire the 3D environment information around the LiDAR system. For example, as shown in FIG. 8b, using one LiDAR in the LiDAR system to acquire the 3D environment information around the LiDAR system can be specifically as follows: the LiDAR 1031 in the LiDAR system 103 is used to acquire the 3D environment information around the LiDAR system 103. Using the plurality of LiDARs in the LiDAR system to acquire the 3D environment information around the LiDAR system can also be specifically as follows: acquiring partial 3D environment information via the LiDARs 1031, 1032, and 1033 in the LiDAR system 103 (for example, the LiDAR 1031 acquires the front 3D environment information, the LiDAR 1032 acquires the right 3D environment information, and the LiDAR 1033 acquires the left 3D environment information), and integrating the acquired 3D environment information to acquire complete 3D environment information.

Step 220: based on the 3D environment information, identifying a scenario type where the LiDAR system is positioned and a drivable area.

The specific implementation of step 220 is substantially the same as that of step 120 in the foregoing embodiments, which is not repeated here.

Step 230: determining the parameter adjusting strategy of each LiDAR in the LiDAR system according to the scenario type and the drivable area, and adjusting the current operating parameters of each LiDAR based on the parameter adjusting strategy of each LiDAR.

Specifically, step 230 includes:

Step 231: according to the scenario type, determining scenario parameter adjusting strategies of one or more of a horizontal angle of field of view, a vertical angle of field of view, a direction of an optical axis of an emitting laser beam, a scanning density, a scanning frequency, and a pulse emitting power of each LiDAR of the LiDAR system.

The scenario parameter adjusting strategy and the corresponding relationship between the scenario type and the scenario parameter adjusting strategy are preset by a user according to the scenario type. The scenario parameter adjusting strategies of different LiDARs in the LiDAR system can be different. For example, the corresponding relationship between the scenario type and the scenario parameter adjusting strategies of different LiDARs can also be preset by the user according to the scenario type and the positions of different LiDARs. In this embodiment, the step of, according to the scenario type, determining scenario parameter adjusting strategies of one or more of the horizontal angle of field of view, the vertical angle of field of view, the direction of the optical axis of the emitting laser beam, the scanning density, the scanning frequency, and the pulse emitting power of each LiDAR of the LiDAR system can be specifically: acquiring an identifier of the LiDAR in the LiDAR system, and determining the scenario parameter adjusting strategies corresponding to the identified scenario type and the acquired identifier of the LiDAR according to the corresponding relationship among the preset scenario type, the identifier of the LiDAR and the scenario parameter adjusting strategy.

For example, as shown in FIG. 8b, it is assumed that the identifiers of the LiDAR 1031, 1032, and 1033 are a, b, and c, respectively. Then the scenario parameter adjusting strategy corresponding to the identified scenario type and the identifiers a, b, and c is determined. When the current scenario type is detected as a highway scenario type, a step of determining the scenario parameter adjusting strategy corresponding to a is as follows: reducing the vertical angle of field of view of the LiDAR, reducing the pulse emitting frequency of the emitting laser beam of the LiDAR, and increasing the scanning frequency of the LiDAR. A step of determining the scenario parameter adjusting strategies corresponding to b and c is as follows: reducing the horizontal angle of field of view of the LiDAR, reducing the pulse emitting frequency of the emitting laser beam of the LiDAR, increasing the scanning frequency of the LiDAR, hence increasing front and rear detection distances of the LiDAR on a roof of a car, compressing left and right detection distance of the LiDAR on both sides of the roof of the car, and detecting changes of a moving object faster. When the current scenario type is detected as an intersection scenario type, the step of determining the scenario parameter adjusting strategy corresponding to a is as follows: increasing the vertical angle of field of view of the LiDAR, increasing the pulse emitting frequency of the LiDAR, reducing the direction of the optical axis of the emitting laser beam of the LiDAR, and increasing the scanning frequency of the LiDAR. The step of determining the scenario parameter adjusting strategies corresponding to b and c is as follows: reducing the horizontal angle of field of view of the LiDAR, increasing the pulse emitting frequency of the LiDAR, increasing the scanning frequency of the LiDAR, making the detection range of the emitting laser beam of the LiDAR on the roof of the car closer to the ground by decreasing the front and rear detection distances of the LiDAR on the roof of the car, compressing the left and right detection distances of the LiDAR on both sides of the roof of the car, and making all LiDARs detect the changes of the moving object faster. When the current scenario type is detected as a parking lot scenario type, the step of determining the scenario parameter adjusting strategy corresponding to a is as follows: reducing the vertical angle of field of view of the LiDAR, reducing the pulse emitting frequency of the LiDAR, and reducing the scanning frequency of the LiDAR. The step of determining the scenario parameter adjusting strategies corresponding to b and c is as follows: reducing the horizontal angle of field of view of the LiDAR, reducing the pulse emitting frequency of the LiDAR, reducing the scanning frequency of the LiDAR, hence reducing the detection range of the LiDAR and reducing the power consumption of the LiDAR.

In some embodiments, the parameter adjusting strategy of each LiDAR can be determined according to a scanning area range of each LiDAR.

Before matching the standard driving area with the driving area, and adjusting the scenario parameter adjusting strategy of each LiDAR in the LiDAR system according to matching results and the driving parameter adjusting strategy of each LiDAR in the LiDAR system, the method further includes: acquiring the scanning area range of each LiDAR in the LiDAR system; and determining the parameter adjusting strategy of each LiDAR according to the scanning area range of each LiDAR.

For the LiDAR system shown in FIG. 8b, the center LiDAR 1031 is configured to detect a mid-to-far field of view. The LiDAR 1033 and the LiDAR 1032 are configured to detect a short field of view and left and right fields of view, respectively.

It can be understood that a central axis of the LiDAR 1031 is perpendicular to a horizontal plane. The central axis of the LiDAR 1031 is a bottom surface normal passing through a center of a bottom surface of the LiDAR 1031. The LiDAR 1031 is positioned on the left side of the center LiDAR, and an angle between a central axis of the LiDAR 1033 and the central axis of the LiDAR 1031 is less than zero degree. The LiDAR 1032 is positioned on the right side of the LiDAR, and an angle between a central axis of the LiDAR 1032 and the central axis of the LiDAR 1031 is greater than zero degree. The central axis of the LiDAR 1032 and the central axis of the LiDAR 1033 are the bottom surface normals passing through the center of the bottom surface of the LiDAR.

It can be understood that the various LiDARs in the LiDAR system can be on the same plane or on different planes.

It can be understood that when detection requirements of the mid-to-far field of view need to be enhanced according to the identified scenario, one or more of the scanning frequency, the scanning density, and the pulse emitting power of the LiDAR 1031 are adjusted. When detection requirements of the left and right fields of view of a near-field of a car need to be enhanced according to the identified scenario, one or more of the direction of the optical axis, the scanning density, the scanning frequency and the pulse emitting power of the left LiDAR 1033 and the right LiDAR 1032 can be adjusted.

In some other embodiments, the LiDAR system can also select part of the LiDARs to work or all LiDARs to work according to the identified scenario. For example, as shown in FIG. 8b, when a scenario is identified as a highway scenario (that is, it is more necessary to detect the mid-to-far field of view), the LiDAR 1031 can be selected to work, and the adjusting parameters of the LiDAR 1031 can be determined according to the scenario and the driving area. When the scenario is identified as an intersection scenario (that is, detection of an object around a car body needs to be enhanced), all the LiDARs in the system can be switched on to work at the same time, and the operating parameters of the LiDAR 1033 and the LiDAR 1032 in the system (as shown in FIG. 8b) are adjusted.

It can be understood that as shown in FIG. 8c, the LiDAR system 103 can also include five LiDARs. The center LiDAR 1034 is configured to detect the mid-to-far field of view. The LiDAR 1035 and the LiDAR 1036 are configured to detect the short field of view on the left and right, respectively. The LiDARs 1037 and 1038 are configured to detect front and back short fields of view.

When the LiDAR system includes five LiDARs, the LiDAR system determines the parameter adjusting strategy of each LiDAR according to the scanning area range of each LiDAR. Specifically, for example, as shown in FIG. 8c, when the scenario is identified as the highway scenario (that is, it is more necessary to detect the mid-to-far field of view), the LiDAR 1034 can be selected to work, and the adjusting parameters of the LiDAR 1034 can be determined according to the scenario and the drivable area. When the scenario is identified as an intersection scenario (that is, detection of an object around a car body needs to be enhanced), all the LiDARs in the system can be switched on to work at the same time, and the operating parameters of the LiDAR 1035, the LiDAR 1036, the LiDAR 1037, and the LiDAR 1038 in the system (as shown in FIG. 8c) are adjusted.

Step 232: according to the drivable area, adjusting the scenario parameter adjusting strategy of each LiDAR, determining the adjusted scenario parameter adjusting strategy of each LiDAR as the parameter adjusting strategy of each LiDAR, and adjusting the current operating parameters of each LiDAR based on the parameter adjusting strategy of each LiDAR, respectively.

Step 232 can specifically include:

Step 2321: according to the scenario type, acquiring a standard driving area in the scenario type and driving parameter adjusting strategies of the horizontal angle of field of view and the vertical angle of field of view of the LiDARs of the LiDAR system that correspond to the standard driving area.

The corresponding relationship between the scenario type and the standard driving area is preset, and the standard driving area under the current scenario type can be searched in the corresponding relationship between the scenario type and the standard driving area according to the current scenario type. For example, if a standard driving area corresponding to the highway scenario type is preset as a specific straight road area, then when the scenario type is determined as the highway scenario type, the corresponding standard driving area is searched to be the specific straight road area. At the same time, the corresponding relationship among the scenario type, the standard driving area, and the driving parameter adjusting strategy is provided. Ideally, the drivable area of a certain scenario type is the standard driving area. Preset standard parameters of an angle of field of view can be set according to the standard driving area. However, the actually determined drivable area cannot exactly coincide with the standard driving area. Therefore, by presetting the corresponding relationship between the standard driving area and the parameter adjusting strategies of the horizontal angle of field of view and the vertical angle of field of view of each LiDAR of the LiDAR system, the driving parameter adjusting strategies of the horizontal angle of field of view and the vertical angle of field of view of each LiDAR corresponding to the acquired standard driving area can be searched in the corresponding relationship between the standard driving area and the driving parameter adjusting strategies of the horizontal angle of field of view and the vertical angle of field of view of each LiDAR of the LiDAR system, according to the acquired standard driving area.

Step 2322: matching the standard driving area with the drivable area, and adjusting the scenario parameter adjusting strategy of each LiDAR in the LiDAR system according to matching results and the driving parameter adjusting strategy of each LiDAR in the LiDAR system.

In some embodiments, the steps of matching the standard driving area with the drivable area, and adjusting the scenario parameter adjusting strategy of each LiDAR in the LiDAR system according to matching results and the driving parameter adjusting strategy of each LiDAR in the LiDAR system specifically include: analyzing a topological structure of the drivable area and a topological structure of the standard driving area; calculating a topological correlation between the topological structure of the drivable area and the topological structure of the standard driving area; determining a scenario difference coefficient of the drivable area relative to the standard driving area according to the topological correlation, where the scenario difference coefficient includes a translation difference coefficient, a rotation difference coefficient, a scaling difference coefficient, etc.; and adjusting the scenario parameter adjusting strategy of each LiDAR in the LiDAR system according to the scenario difference coefficient and the driving parameter adjusting strategy of each LiDAR in the LiDAR system. In some embodiments, the steps of adjusting the scenario parameter adjusting strategy of each LiDAR in the LiDAR system according to the scenario difference coefficient and the driving parameter adjusting strategy of each LiDAR in the LiDAR system specifically includes: acquiring the standard parameter of the angle of field of view (including a standard parameter of the vertical angle of field of view and a standard parameter of the horizontal angle of field of view) in the driving parameter adjusting strategy of a certain LiDAR; according to the scenario difference coefficient and based on the standard parameter of the angle of field of view, calculating in an equal proportion a parameter of a new angle of field of view (including a new vertical angle of field of view and a new horizontal angle of field of view); according to the parameter of the new angle of field of view, adjusting the vertical angle of field of view and the horizontal angle of field of view in the scenario parameter adjusting strategy of the LiDAR; and adjusting the scenario parameter adjustment strategy of each LIDAR in the LIDAR system in the same way.

Step 2323: adjusting the current operating parameters of each LiDAR in the LiDAR system based on the scenario parameter adjusting strategy of each LiDAR in the LiDAR system.

For example, as shown in FIG. 8b, it is assumed that the identifiers of the LiDARs 1031, 1032, and 1033 are a, b, and c, respectively. When the current scenario type is detected as the highway scenario type, the scenario parameter adjusting strategy corresponding to a is determined as follows: compressing the vertical angle of field of view of the emitting laser beam from +90° to 80°, adjusting the pulse emitting frequency of the emitting laser beam from 50,000 shots per second to 10,000 shots per second, and adjusting the scanning frequency from 10 Hz to 15 Hz. The step of determining the corresponding scenario parameter adjusting strategies of b and c is as follows: compressing the horizontal angle of field of view of the emitting laser beam from +180° to 120°, adjusting the pulse emitting frequency of the emitting laser beam from 50,000 shots per second to 10,000 shots per second, adjusting the scanning frequency from 10 Hz to 15 Hz. The step of determining the driving parameter adjusting strategy corresponding to a is as follows: the horizontal angle of field of view is 120°, and the vertical angle of field of view is 60°. The step of determining the driving parameter adjusting strategies corresponding to b and c is as follows: the horizontal angle of field of view is 100°, and the vertical angle of field of view is 35°. It is assumed that the topological correlation between the topological structure of the drivable area and the topological structure of the standard driving area is that the centers thereof are coincident, the sides thereof are parallel, the widths thereof are the same, and the ratio of the lengths thereof is 3:5, that is, the translation difference coefficient is 0, the rotation difference coefficient is 0, and the scaling difference coefficient is (3/5)*1. The new horizontal angle of field of view corresponding to a is calculated as (3/5)*120°=72°, and the new vertical angle of field of view is 60°. The new horizontal angles of field of view corresponding to b and c are (3/5)*100°=60°, and the new vertical angle of field of view is 35°. Finally, the step of acquiring the adjusted scenario parameter adjusting strategy corresponding to a is as follows: adjusting the horizontal angle of field of view of the emitting laser beam to 72°, adjusting the vertical angle of field of view of the emitting laser beam to 60°, adjusting the pulse emitting frequency of the emitting beam from 50,000 shots per second to 10,000 shots per second, and adjusting the scanning frequency from 10 Hz to 15 Hz. The adjusted scenario parameter adjusting strategies corresponding to b and c are as follows: adjusting the horizontal angle of field of view of the emitting beam to 60°, adjusting the vertical angle of field of view of the emitting laser beam to 35°, adjusting the pulse emitting frequency of the emitting beam from 50,000 shots per second to 10,000 shots per second, and adjusting the scanning frequency from 10 Hz to 15 Hz.

The embodiment of the present disclosure acquires the 3D environment information around the LiDAR system to identify the scenario type where the LiDAR system is positioned and the drivable area based on the 3D environment information, determine the parameter adjusting strategy of each LiDAR in the LiDAR system according to the scenario type and the drivable area, and adjust the current operating parameters of each LiDAR based on the parameter adjusting strategy of each LiDAR. The embodiment of the present disclosure can automatically adjust the operating parameters of each LiDAR of the LiDAR system according to different scenarios, so that the working state of the LiDAR system is automatically adjusted to a working state suitable for the current scenario, thereby improving working efficiency. Further, the embodiment of the present disclosure can also identify the current scenario and detect the drivable area in real time, so as to adjust the scanning range of each LiDAR of the LiDAR system to be adapted to the drivable area, which not only can improve a detection rate of an obstacle, but also can improve a utilization rate of computing resources and reduce power consumption.

Figure 10:
FIG. 10 shows a schematic structural diagram of a device for adjusting parameters of a LiDAR according to an embodiment of the present disclosure.

FIG. 10 shows a schematic structural diagram of a device for adjusting parameters of a LiDAR according to an embodiment of the present disclosure. The device can be applied to a LiDAR or a LiDAR system in the forgoing embodiments. As shown in FIG. 10, the device 600 includes an environmental information acquisition module 610, an identification module 620, and an adjusting module 630.

The environmental information acquisition module 610 is configured to acquire 3D environmental information around the LiDAR.

The identification module 620 is configured to identify the scenario type and the drivable area of the LiDAR based on the 3D environment information. The adjusting module 630 is configured to determine the parameter adjusting strategy of the LiDAR according to the scenario type and the drivable area, and adjust the current operating parameters of the LiDAR based on the parameter adjusting strategy.

In some embodiments, the 3D environment information includes 3D point cloud data. The identification module 620 is specifically configured to: process the 3D point cloud data to generate a multi-channel point cloud feature map; extract high-dimensional feature information from the multi-channel point cloud feature map; determine the scenario type according to the high-dimensional feature information; and determine the drivable area according to the high-dimensional feature information.

In some embodiments, the identification module 620 is specifically configured to: input the multi-channel point cloud feature map into a first neural network, and acquire the high-dimensional feature information output by the first neural network; input the high-dimensional feature information into a second neural network, and acquire an output value of a scenario type output by the second neural network; determine the scenario type corresponding to the output value of the scenario type according to the corresponding relationship between an output value of the preset scenario type and the scenario type label; input the high-dimensional feature information into a third neural network, and acquire an output map of the drivable area output by the third neural network; and determine the drivable area corresponding to the output map of the drivable area according to the corresponding relationship between an output map of a preset drivable area and a drivable area label.

In some embodiments, the adjusting module 630 is specifically configured to: according to the scenario type, determine scenario parameter adjusting strategies of one or more of a horizontal angle of field of view of the LiDAR, a vertical angle of field of view of the LiDAR, a direction of an optical axis of an emitting laser beam of the LiDAR, a scanning density of the LiDAR, a scanning frequency of the LiDAR, and a pulse emitting power of the LiDAR; adjust the scenario parameter adjusting strategy according to the drivable area; determine the adjusted scenario parameter adjusting strategy as the parameter adjusting strategy of the LiDAR, and adjust the current operating parameters of the LiDAR based on the parameter adjusting strategy.

In some embodiments, the adjusting module 630 is specifically further configured to: according to the scenario type, acquire a standard driving area in the scenario type and driving parameter adjusting strategies of the horizontal angle of field of view of the LiDAR and the vertical angle of field of view of the LiDAR that correspond to the standard driving area, match the standard driving area with the drivable area, adjust the scenario parameter adjusting strategy according to the matching results and the driving parameter adjusting strategy, and adjust the current operating parameters of the LiDAR based on the adjusted scenario parameter adjusting strategy.

In some embodiments, the adjusting module 630 is specifically further configured to: analyze a topological structure of the drivable area and a topological structure of the standard driving area; calculate a topological correlation between the topological structure of the drivable area and the topological structure of the standard driving area; determine a scenario difference coefficient of the drivable area relative to the standard driving area according to the topological correlation; and adjust the scenario parameter adjusting strategy according to the scenario difference coefficient and the driving parameter adjusting strategy.

In some embodiments, the current operating parameters of the LiDAR comprise one or more of the vertical angle of field of view of the emitting laser beam of the LiDAR, the horizontal angle of field of view of the emitting laser beam of the LiDAR, the direction of the optical axis of the emitting laser beam of the LiDAR, the scanning frequency of the LiDAR, and the pulse emitting frequency of the LiDAR.

It should be noted that the device for adjusting parameters of the LiDAR according to the embodiment of the present disclosure is a device that can execute the forgoing method for adjusting the parameters of the LiDAR. All embodiments of the forgoing method for adjusting the parameters of the LiDAR are applicable to the device, and can achieve the same or similar beneficial effects.

This embodiment acquires the 3D environment information around the LiDAR to identify the scenario type where the LiDAR is positioned and the drivable area based on the 3D environment information, determine the parameter adjusting strategy of the LiDAR according to the scenario type and the drivable area, and adjust the current operating parameters of the LiDAR based on the parameter adjusting strategy. The embodiment of the present disclosure can automatically adjust the operating parameters of the LiDAR according to different scenarios, so that the working state of the LiDAR is automatically adjusted to a working state suitable for the current scenario, thereby improving working efficiency of the LiDAR. Further, the embodiment of the present disclosure can also identify the current scenario and detect the drivable area in real time, so as to adjust the scanning range of the LiDAR to be adapted to the drivable area, which not only can improve a detection rate of an obstacle, but also can improve a utilization rate of computing resources and reduce power consumption.

An embodiment of the present disclosure also provides a computer storage medium. At least one executable instruction is stored in the computer storage medium, and causes the processor to execute the steps of the forgoing method for adjusting the parameters of the LiDAR.

The embodiment of the present disclosure also provides a computer program product, including a computer program stored on a computer storage medium. The computer program includes program instructions. When the program instructions are executed by a computer, the computer program executes the forgoing method for adjusting the parameters of the LiDAR in any of the foregoing method embodiments.

Figure 11:
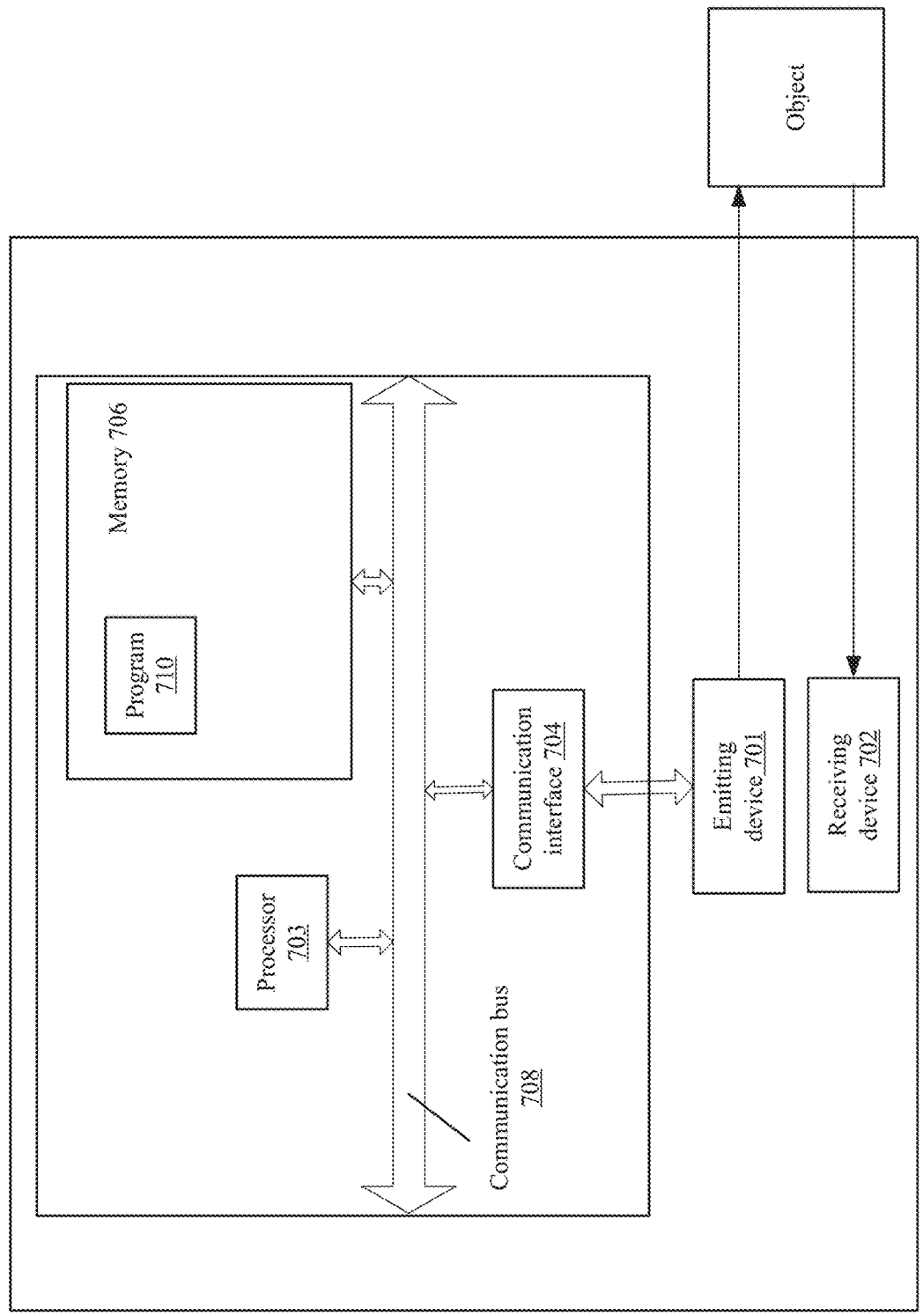
FIG. 11 shows a schematic structural diagram of a LiDAR according to an embodiment of the present disclosure.

FIG. 11 shows a schematic structural diagram of a LiDAR according to an embodiment of the present disclosure, and specific embodiments of the present disclosure do not limit the specific implementation of the LiDAR.

As shown in FIG. 11, the LiDAR can include: an emitting device 701, a receiving device 702, a processor 703, a communication interface 704, a memory 706, and a communication bus 708.

The emitting device 701 is configured to emit emergent laser to a detection area, and the receiving device 702 is configured to receive echo laser reflected by an object in the detection area. The emitting device 701 is specifically configured to scan and emit the emergent laser to the detection area to scan an object in the detection area.

The processor 703, the communication interface 704, and the memory 706 communicate with each other via the communication bus 708. The communication interface 704 is configured to communicate with other devices, such as a client, other servers, or other network elements. The processor 703 is connected to the emitting device 701 via the communication interface 704, and configured to execute the program 710, which can specifically execute the forgoing method for adjusting the parameters of the LiDAR in any of the foregoing method embodiments.

Specifically, the program 710 can include a program code, and the program code includes computer operation instructions.

The processor 703 can be a central processing unit (CPU), or an Application Specific Integrated Circuit (ASIC), or one or more integrated circuits configured to implement the embodiments of the present disclosure. One or more processors included in the computing device can be the same type of processor, such as one or more CPUs, or different types of processors, such as one or more CPUs and one or more ASICs.

The memory 706 is configured to store program 710. The memory 706 can include a high-speed RAM memory, and can also include a non-volatile memory, for example, at least one magnetic disk memory.

This embodiment acquires the 3D environment information around the LiDAR to identify the scenario type where the LiDAR is positioned and the drivable area based on the 3D environment information, determine the parameter adjusting strategy of the LiDAR according to the scenario type and the drivable area, and adjust the current operating parameters of the LiDAR based on the parameter adjusting strategy. The embodiment of the present disclosure can automatically adjust the operating parameters of the LiDAR according to different scenarios, so that the working state of the LiDAR is automatically adjusted to a working state suitable for the current scenario, thereby improving working efficiency of the LiDAR. Further, the embodiment of the present disclosure can also identify the current scenario and detect the drivable area in real time, so as to adjust the scanning range of the LiDAR to be adapted to the drivable area, which not only can improve a detection rate of an obstacle, but also can improve a utilization rate of computing resources and reduce power consumption.

The algorithms or displays provided here are not inherently related to any particular computer, virtual system, or other equipment. Various general-purpose systems can also be used in conjunction with the teachings based on this. Based on the forgoing description, the structure required to construct this type of system is obvious. In addition, the embodiments of the present disclosure are not directed to any specific programming language. It should be understood that various programming languages can be used to implement the content of the present disclosure described herein.

In the specification provided here, a lot of specific details are described. However, it can be understood that embodiments of the present disclosure can be practiced without these specific details. In some instances, common methods, structures, and technologies are not shown in detail, so as not to obscure the understanding of this specification.

Similarly, it should be understood that in order to streamline the present disclosure and help understand one or more of the various inventive aspects, in the forgoing description of the exemplary embodiments of the present disclosure, the various features of the embodiments of the present disclosure are sometimes grouped together into a single implementation, example, diagram, or description. However, the disclosed method should not be interpreted as reflecting the intention that the claimed invention requires more features than those explicitly stated in each claim.

The person skilled in the art can understand that it is possible to adaptively change the modules in a device in the embodiment. The modules can be arranged in one or more devices different from the embodiment. The modules or units or assemblies in the embodiments can be combined into one module or unit or assembly. In addition, the modules or units or assemblies can be divided into a plurality of sub-modules or sub-units or sub-assemblies. Unless expressly stated otherwise, each feature disclosed in this specification (including the accompanying claims, abstract and drawings) can be replaced by an alternative feature providing the same, equivalent, or similar objective.

In addition, the person skilled in the art can understand that although some embodiments herein include certain features included in other embodiments but not other features, the combination of features of different embodiments means that the combinations of features of different embodiments fall within the scope of the present disclosure and form different embodiments.

It should be noted that the forgoing embodiments illustrate rather than limit the present disclosure, and the person skilled in the art can design alternative embodiments without departing from the scope of the appended claims. In the claims, any reference signs between parentheses should not be constructed as a limitation to the claims. The word "comprising" or "comprise" does not exclude the presence of elements or steps not listed in the claims. The word "a" or "an" that precedes an element does not exclude the presence of a plurality of such elements. The invention can be implemented by means of hardware comprising a plurality of different elements and by means of a suitably programmed computer. In the unit claims enumerating a plurality of devices, a plurality of these devices can be embodied in the same hardware item. The use of the words "first," "second," "third," etc. do not indicate any order. These words can be interpreted as names. Unless otherwise specified, the steps in the foregoing embodiments should not be understood as a limitation on an execution order.

What is claimed is:

1. A method for adjusting parameters of a LiDAR, comprising:
    acquiring 3D environment information around the LiDAR;
    identifying a scenario type where the LiDAR is positioned and a drivable area based on the 3D environment information; and
    according to the scenario type, determining a scenario parameter adjusting strategy of one or more of a horizontal angle of field of view of the LiDAR, a vertical angle of field of view of the LiDAR, a direction of an optical axis of an emitting laser beam of the LiDAR, a scanning density of the LiDAR, a scanning frequency of the LiDAR, and a pulse emitting power of the LiDAR; and
    according to the drivable area, adjusting the scenario parameter adjusting strategy, determining the adjusted scenario parameter adjusting strategy as a parameter adjusting strategy of the LiDAR, and adjusting the current operating parameters of the LiDAR based on the parameter adjusting strategy,
    wherein adjusting the scenario parameter adjusting strategy according to the drivable area, determining the adjusted scenario parameter adjusting strategy as the parameter adjusting strategy of the LiDAR, and adjusting the current operating parameters of the LiDAR based on the parameter adjusting strategy specifically comprise:
according to the scenario type, acquiring a standard driving area in the scenario type and driving parameter adjusting strategies of the horizontal angle of field of view of the LiDAR and the vertical angle of field of view of the LiDAR that correspond to the standard driving area;
matching the drivable area with the standard driving area, and readjusting the scenario parameter adjusting strategy according to matching results and the driving parameter adjusting strategy; and
adjusting the current operating parameters of the LiDAR based on the adjusted scenario parameter adjusting strategy,
wherein matching the drivable area with the standard driving area, and readjusting the scenario parameter adjusting strategy according to the matching results and the driving parameter adjusting strategy comprise:
analyzing a topological structure of the drivable area and a topological structure of the standard driving area;
calculating a topological correlation between the topological structure of the drivable area and the topological structure of the standard driving area;
determining a scenario difference coefficient of the drivable area relative to the standard driving area according to the topological correlation; and
adjusting the scenario parameter adjusting strategy according to the scenario difference coefficient and the driving parameter adjusting strategy.

2. The method according to claim 1, wherein the 3D environment information comprises 3D point cloud data, and
wherein identifying the scenario type where the LiDAR is positioned and the drivable area based on the 3D environment information comprises:
processing the 3D point cloud data to generate a multi-channel point cloud feature map;
extracting high-dimensional feature information from the multi-channel point cloud feature map;
determining the scenario type according to the high-dimensional feature information; and
determining the drivable area according to the high-dimensional feature information.

3. The method according to claim 2, wherein
extracting the high-dimensional feature information from the multi-channel point cloud feature map comprises:
inputting the multi-channel point cloud feature map into a first neural network, and acquiring the high-dimensional feature information output by the first neural network;
determining the scenario type according to the high-dimensional feature information comprises:
inputting the high-dimensional feature information into a second neural network, and acquiring an output value of the scenario type output by the second neural network; and
determining the scenario type corresponding to the output value of the scenario type according to a corresponding relationship between the output value of the scenario type and a scenario type label;
determining the drivable area according to the high-dimensional feature information comprises:

inputting the high-dimensional feature information into a third neural network, and acquiring an output map of the drivable area output by the third neural network; and
determining the drivable area corresponding to the output map of the drivable area according to a corresponding relationship between an output map of a preset drivable area and a drivable area label.

4. The method according to claim 1, wherein the current operating parameters of the LiDAR comprise one or more of a vertical angle of field of view of an emitting laser beam of the LiDAR, a horizontal angle of field of view of the emitting laser beam of the LiDAR, a direction of an optical axis of the emitting laser beam of the LiDAR, a scanning frequency of the LiDAR, and a pulse emitting frequency of the LiDAR.

5. A device for adjusting parameters of a LiDAR, comprising:
an environmental information acquisition module, configured to acquire 3D environmental information around the LiDAR;
an identification module, configured to identify a scenario type where the LiDAR is positioned and a drivable area based on the 3D environment information; and
an adjusting module, configured to determine a scenario parameter adjusting strategy of one or more of a horizontal angle of field of view of the LiDAR according to the scenario type, a vertical angle of field of view of the LiDAR, a direction of an optical axis of an emitting laser beam of the LiDAR, a scanning density of the LiDAR, a scanning frequency of the LiDAR, and a pulse emitting power of the LiDAR; and
adjusting the scenario parameter adjusting strategy, determining the adjusted scenario parameter adjusting strategy as a parameter adjusting strategy of the LiDAR according to the drivable area, and to adjust the current operating parameters of the LiDAR based on the parameter adjusting strategy,
wherein the adjusting module is configured to:
according to the scenario type, acquiring a standard driving area in the scenario type and driving parameter adjusting strategies of the horizontal angle of field of view of the LiDAR and the vertical angle of field of view of the LiDAR that correspond to the standard driving area;
matching the drivable area with the standard driving area, and readjusting the scenario parameter adjusting strategy according to matching results and the driving parameter adjusting strategy; and
adjusting the current operating parameters of the LiDAR based on the adjusted scenario parameter adjusting strategy,
wherein matching the drivable area with the standard driving area, and readjusting the scenario parameter adjusting strategy according to the matching results and the driving parameter adjusting strategy comprise:
analyzing a topological structure of the drivable area and a topological structure of the standard driving area;
calculating a topological correlation between the topological structure of the drivable area and the topological structure of the standard driving area;
determining a scenario difference coefficient of the drivable area relative to the standard driving area according to the topological correlation; and adjusting the scenario parameter adjusting strategy according to the scenario difference coefficient and the driving parameter adjusting strategy.

6. A LiDAR, comprising: an emitting device, a receiving device, a processor, a memory, a communication interface, and a communication bus, wherein
 the processor, the memory, and the communication interface complete mutual communication with each other via the communication bus;
 the emitting device is configured to emit emergent laser to a detection area;
 the receiving device is configured to receive echo laser reflected by an object in the detection area; and
 the memory is configured to store at least one executable instruction, and the executable instruction causes the processor to execute the steps of the method for adjusting the parameters of the LiDAR according to claim 1, to adjust operating parameters of the emitting device.

\* \* \* \* \*